(12) United States Patent
Aoki et al.

(10) Patent No.: US 12,153,745 B2
(45) Date of Patent: *Nov. 26, 2024

(54) ELECTRONIC PEN AND CARTRIDGE-TYPE ELECTRONIC PEN MAIN BODY INCLUDING AN CONDUCTIVE CENTER ELECTRODE AND A PERIPHERAL ELECTRODE

(71) Applicant: Wacom Co., Ltd., Saitama (JP)

(72) Inventors: Shinya Aoki, Saitama (JP); Yoshiyuki Hashimoto, Saitama (JP); Takenori Kaneda, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/529,385

(22) Filed: Dec. 5, 2023

(65) Prior Publication Data

US 2024/0103649 A1 Mar. 28, 2024

Related U.S. Application Data

(63) Continuation of application No. 17/690,633, filed on Mar. 9, 2022, now Pat. No. 11,874,977, which is a
(Continued)

(30) Foreign Application Priority Data

Oct. 16, 2019 (JP) .................. 2019-189501

(51) Int. Cl.
*G06F 3/0354* (2013.01)
*G06F 3/038* (2013.01)

(52) U.S. Cl.
CPC ........ *G06F 3/03546* (2013.01); *G06F 3/0383* (2013.01)

(58) Field of Classification Search
None
See application file for complete search history.

(56) References Cited

U.S. PATENT DOCUMENTS

| 5,061,105 A | 10/1991 | Isoda |
| 6,062,753 A | 5/2000 | Hadtke et al. |

(Continued)

FOREIGN PATENT DOCUMENTS

| JP | 2013161307 A | 8/2013 |
| JP | 5687398 B1 | 3/2015 |

(Continued)

OTHER PUBLICATIONS

Extended European Search Report, mailed Sep. 30, 2022, for European Application No. 20876225.2-1224 / 4026703, 11 pages.
(Continued)

*Primary Examiner* — Kirk W Hermann
(74) *Attorney, Agent, or Firm* — Seed IP Law Group LLP

(57) ABSTRACT

A cartridge-type electronic pen main body includes a conductive center electrode and a peripheral electrode disposed around the center electrode. The peripheral electrode includes a tapered part on a pen tip side and a cylindrical shaped part on an opposite side along an axial direction. When the cartridge-type electronic pen main body is in use, one end of the center electrode forming a pen tip is projected to the outside from an opening of a cylindrical housing of an electronic pen, and a portion of the tapered part of the peripheral electrode is also projected to the outside such that both the one end of the center electrode and the portion of the tapered part of the peripheral electrode are projected beyond a distal end of the cylindrical housing to capacitively couple with a sensor surface while the cylindrical shaped part of the peripheral electrode remains within the cylindrical housing.

16 Claims, 11 Drawing Sheets

Related U.S. Application Data continuation of application No. PCT/JP2020/037051, filed on Sep. 30, 2020.

(56) References Cited

U.S. PATENT DOCUMENTS

| | | | |
|---|---|---|---|
| 11,163,407 | B2 | 11/2021 | Lee et al. |
| 2012/0327042 | A1* | 12/2012 | Harley ................. G06F 3/0442 |
| | | | 345/179 |
| 2013/0199311 | A1 | 8/2013 | Horie et al. |
| 2016/0246389 | A1 | 8/2016 | Munakata et al. |
| 2016/0378212 | A1 | 12/2016 | Kim et al. |
| 2017/0068339 | A1 | 3/2017 | Zimmerman et al. |
| 2017/0090605 | A1 | 3/2017 | Horie et al. |
| 2017/0102792 | A1 | 4/2017 | Aoki et al. |
| 2017/0228049 | A1 | 8/2017 | Yamamoto |
| 2017/0308185 | A1* | 10/2017 | Eguchi ................. G01D 5/2046 |
| 2017/0357340 | A1 | 12/2017 | Kamiyama et al. |
| 2017/0361639 | A1* | 12/2017 | Kaneda ................. B43K 27/08 |
| 2018/0107293 | A1 | 4/2018 | Yeh |
| 2020/0033958 | A1 | 1/2020 | Yamamoto |
| 2021/0124472 | A1* | 4/2021 | Lee ........................ G06F 3/0354 |

FOREIGN PATENT DOCUMENTS

| | | |
|---|---|---|
| JP | 2016153954 A | 8/2016 |
| JP | 2017224178 A | 12/2017 |
| JP | 2018206093 A | 12/2018 |
| WO | 2018169208 A1 | 9/2018 |

OTHER PUBLICATIONS

International Search Report, mailed Nov. 10, 2020, for International Application No. PCT/JP2020/037051. (2 pages).

* cited by examiner

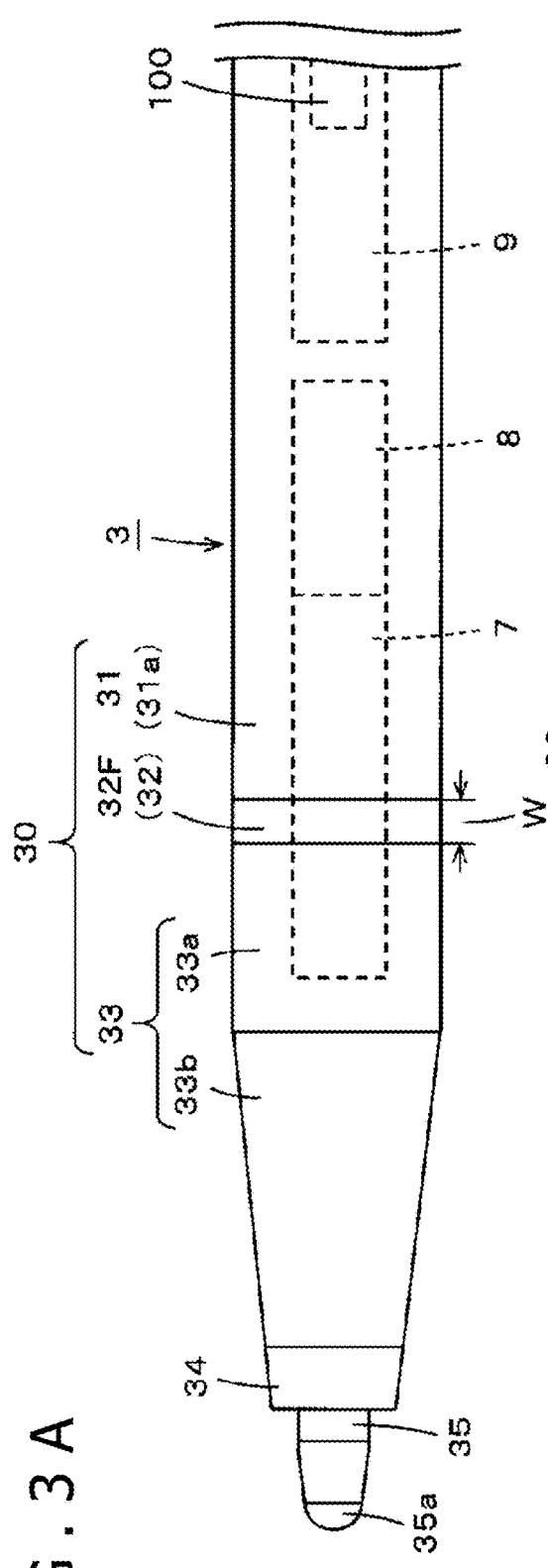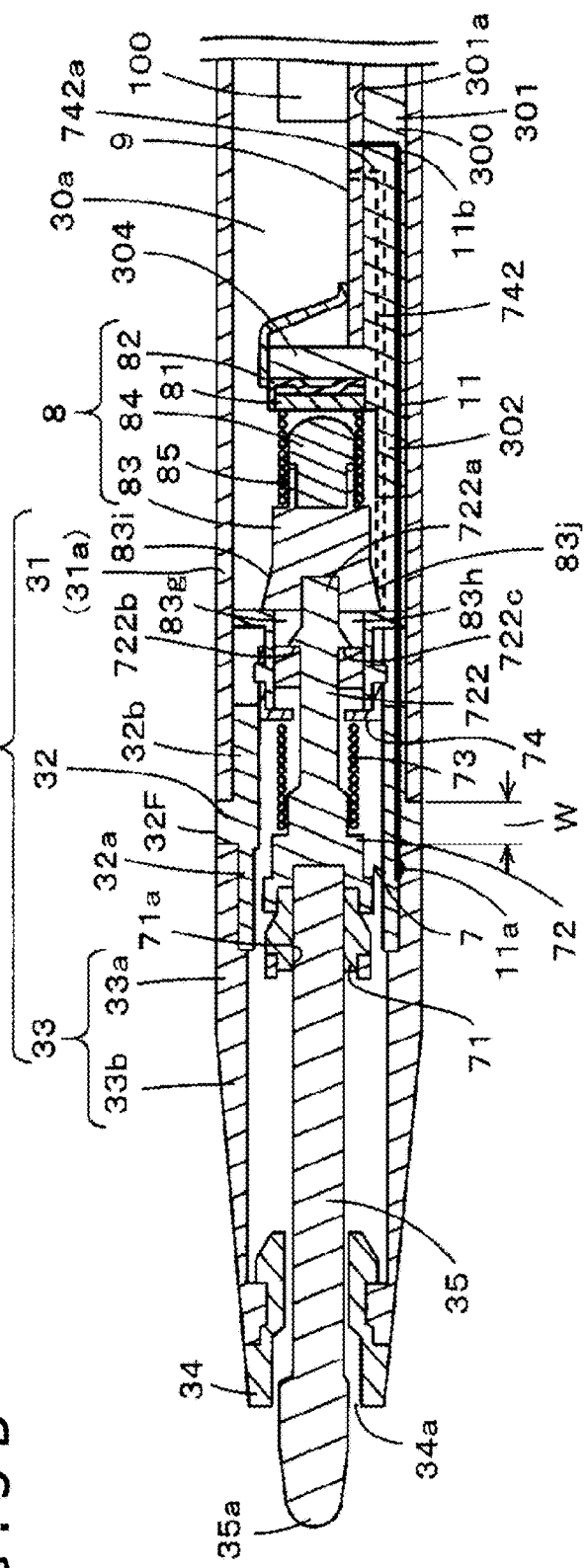
FIG. 3A
FIG. 3B

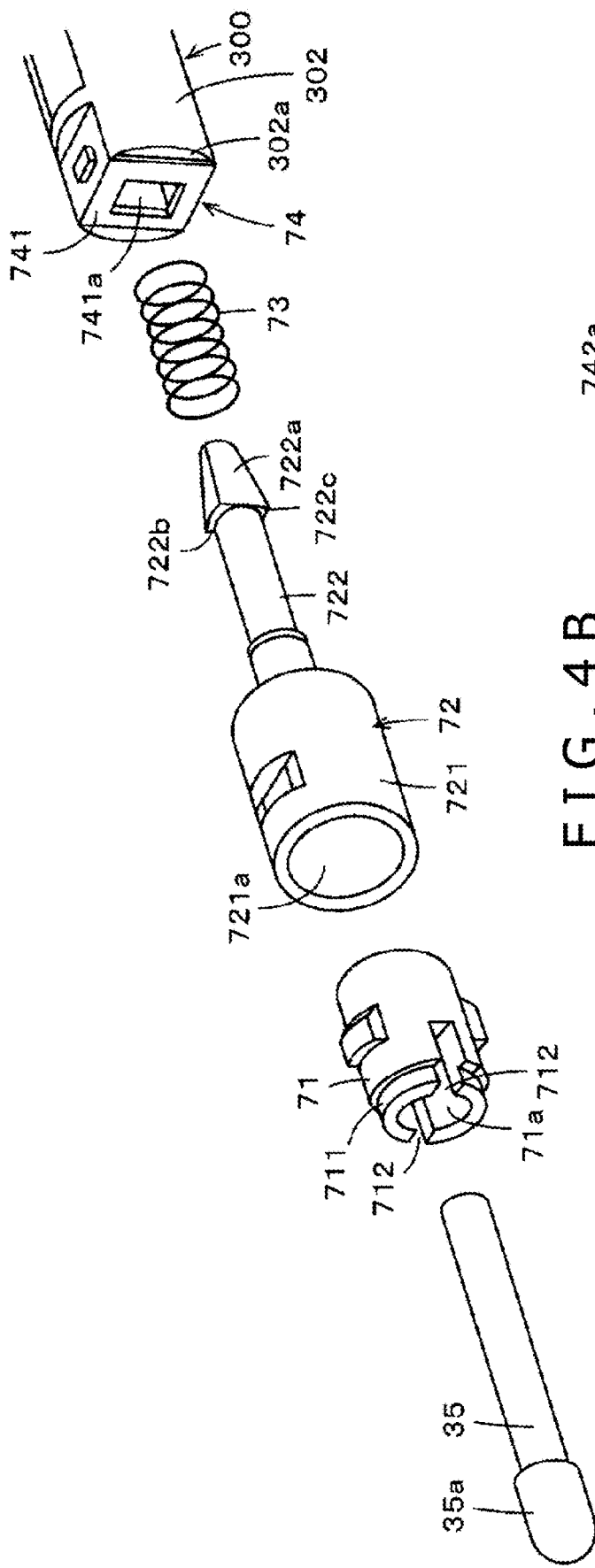
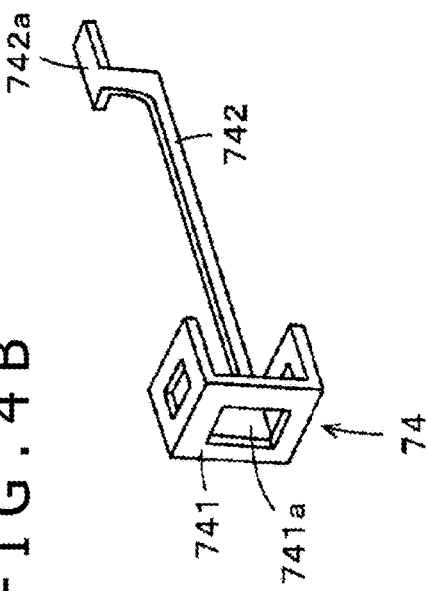
FIG.4A
FIG.4B

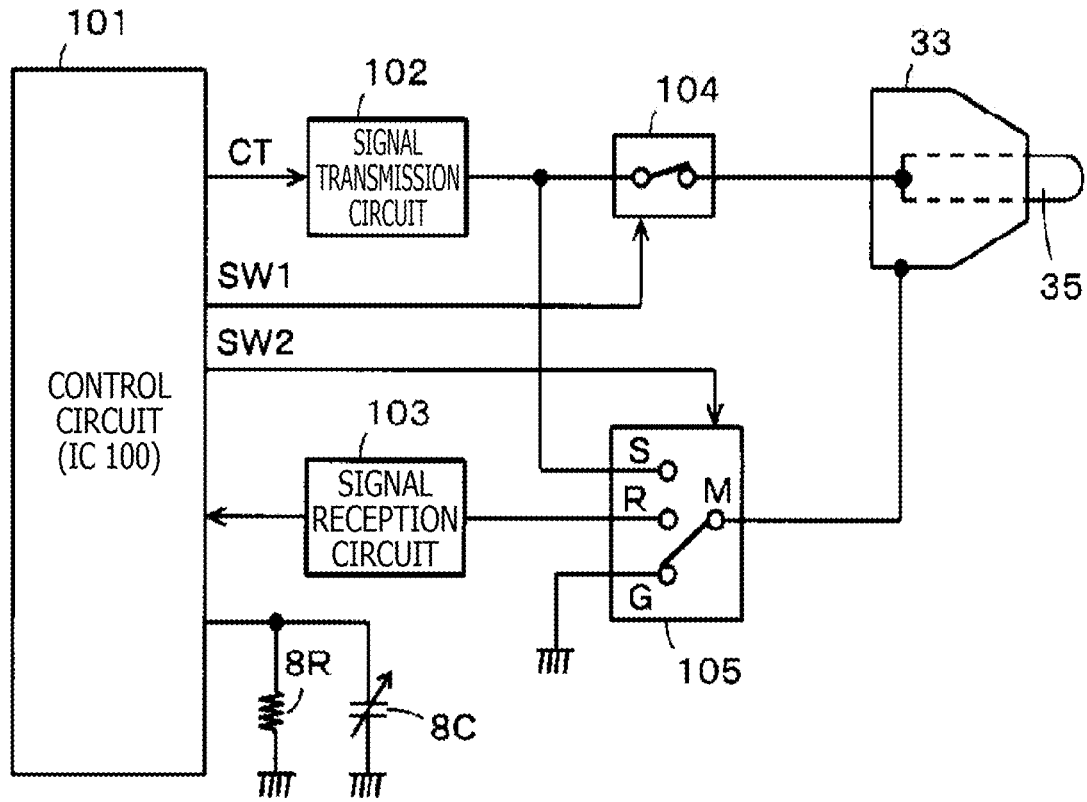

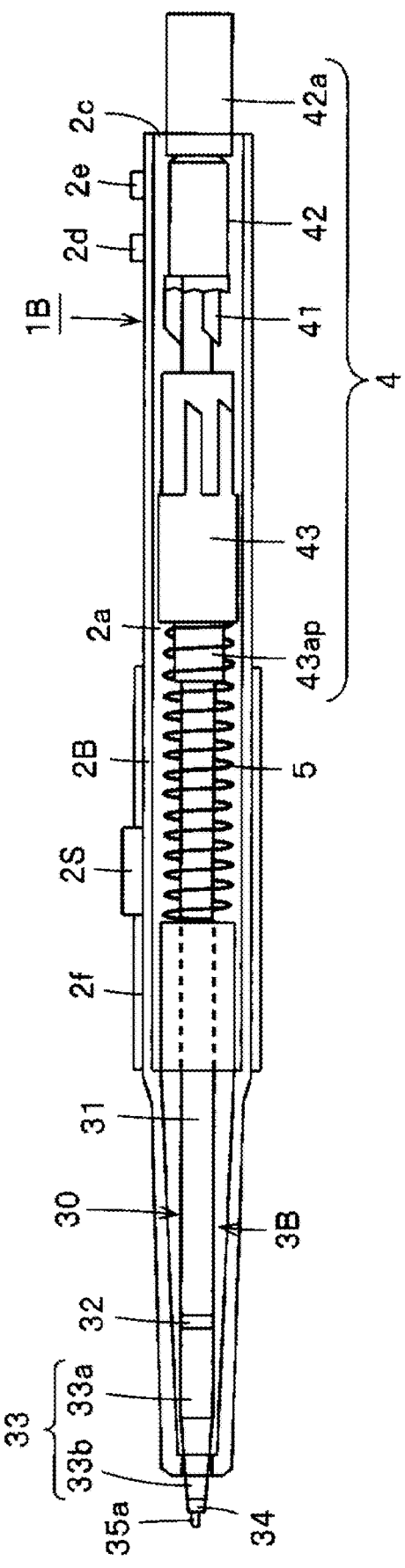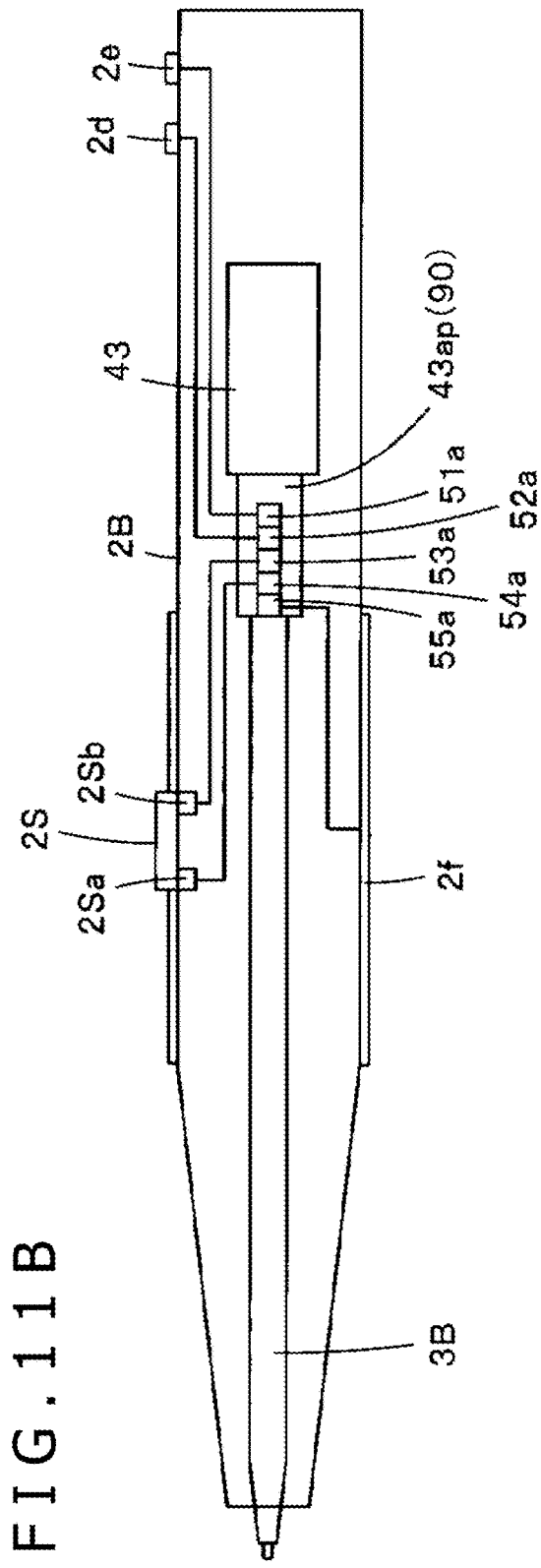

ELECTRONIC PEN AND CARTRIDGE-TYPE ELECTRONIC PEN MAIN BODY INCLUDING AN CONDUCTIVE CENTER ELECTRODE AND A PERIPHERAL ELECTRODE

TECHNICAL FIELD

The present invention relates to an electronic pen and an electronic pen main body both operated by a capacitance method for exchanging signals with a position detection sensor through capacitive coupling.

BACKGROUND ART

Electronic pens operated by a so-called active capacitance method have been commercialized as one type of electronic pen operated based on the capacitance method. The active capacitance method allows the electronic pen to exchange signals (i.e., to interact) with a position detection sensor of a position detection apparatus through capacitive coupling therebetween, so that the position detection sensor may detect positions pointed to by the electronic pen.

This type of electronic pen operated by the active capacitance method incorporates a power supply circuit that uses a primary or a secondary battery, and a signal transmission circuit. A stylus of the electronic pen is configured with a conductor that transmits signals from the signal transmission circuit to the position detection sensor through capacitive coupling (e.g., see Patent Document 1 (Japanese Patent No. 5687398)).

PRIOR ART DOCUMENT

Patent Document

Patent Document 1: Japanese Patent No. 5687398

SUMMARY OF INVENTION

Technical Problem

Along with consumer preference in recent years for miniaturized device has come an increasing demand for mobile electronic devices that are smaller than ever. The electronic pen is intended for use with the position detection sensor mounted on this type of small-sized electronic device. Hence, there comes the demand for thinner electronic pens.

Recently, the electronic pen has been considered an extension of stationery. There is thus a demand for modularizing the internal configuration of the electronic pen, so that the electronic pen may be handled in a manner similar to a ballpoint refill (a refill or a cartridge). In the description that follows, what is referred to as the electronic pen main body is a modularized part that integrates the internal components of the electronic pen and is replaceable just like a ballpoint refill.

The strength of capacitive coupling between the electronic pen and the position detection sensor both operated by the capacitance method is lower than the strength of electromagnetic induction coupling with the electronic pen operated by the electromagnetic induction method. In a case where the electronic pen main body is configured to be a thin refill, the strength of capacitive coupling involved is much lower. One problem is that in such a state, the electronic pen main body needs to be configured in such a manner that the positions pointed to by the electronic pen may still be reliably detected by the position detection sensor operated by the capacitance method.

The present invention is aimed at providing an electronic pen and an electronic pen main body both configured to solve the above problem.

Technical Solution

In solving the above problem, there is provided an electronic pen main body allowing at least a pen tip of an electronic pen to be housed in a cylindrical housing of the electronic pen in such a manner as to be projectable from one opening of the cylindrical housing in an axial direction. The electronic pen main body includes a conductive center electrode of which one end in the axial direction forms the pen tip, and a peripheral electrode disposed around the center electrode except at least for the pen tip, the peripheral electrode being insulated from the center electrode. When the one end of the center electrode forming the pen tip is projected to the outside from the opening of the cylindrical housing upon use, a portion of the pen tip side of the peripheral electrode is also projected to the outside from the opening.

Further, there is provided an electronic pen having a cylindrical housing with an opening on one end thereof forming a pen tip side in an axial direction, the cylindrical housing holding at least one electronic pen main body inside. The electronic pen main body includes a conductive center electrode of which one end in the axial direction forms a pen tip, and a peripheral electrode disposed around the center electrode except at least for the pen tip, the peripheral electrode being insulated from the center electrode. When the one end of the center electrode forming the pen tip is projected to the outside from the opening of the cylindrical housing upon use, a portion of the pen tip side of the peripheral electrode is also projected to the outside from the opening.

With the electronic pen main body of the above-described configuration, the pen tip on the one end of the center electrode is projected from the opening of the electronic pen housing, and the portion of the pen tip side of the peripheral electrode is also projected from the opening of the electronic pen housing. As a result, a distance between the center electrode and the peripheral electrode of the electronic pen and the position detection sensor operated by the capacitance method is shortened, thus ensuring superior capacitive coupling therebetween.

By use of the center electrode and the peripheral electrode of the electronic pen main body configured as described above, it is possible for the position detection sensor operated by the capacitance method to reliably detect the positions pointed to by the electronic pen.

That is, a signal from the position detection sensor is received, for example, by the peripheral electrode of the electronic pen main body. On the basis of the received signal, the transmission of a signal from the center electrode of the electronic pen main body is controlled. This makes it possible for the position detection sensor to reliably detect the signal from the electronic pen main body. When the peripheral electrode is grounded for use as a shield electrode upon signal transmission from the center electrode, the signal can be transmitted without waste from the tip side (pen tip) of the center electrode. When a signal is also transmitted from the peripheral electrode, the peripheral electrode can also be used to detect the tilt angle of the electronic pen.

BRIEF DESCRIPTION OF DRAWINGS

FIGS. 3A and 3B are diagrams for explaining a configuration example of a pen tip of the electronic pen main body in the first embodiment of the present invention.

FIGS. 4A and 4B are diagrams for explaining the configuration example of the electronic pen main body in the first embodiment of the present invention.

FIG. 5 is a block diagram for explaining a configuration example of electronic circuits in the electronic pen main body in the first embodiment of the present invention.

FIGS. 6A-6D are diagrams for explaining the workings of the configuration example of the electronic circuits in the electronic pen main body in the first embodiment of the present invention.

FIGS. 11A and 11B are diagrams for explaining a configuration example of the electronic pen in the third embodiment of the present invention.

DETAILED DESCRIPTION

Figure 1A:
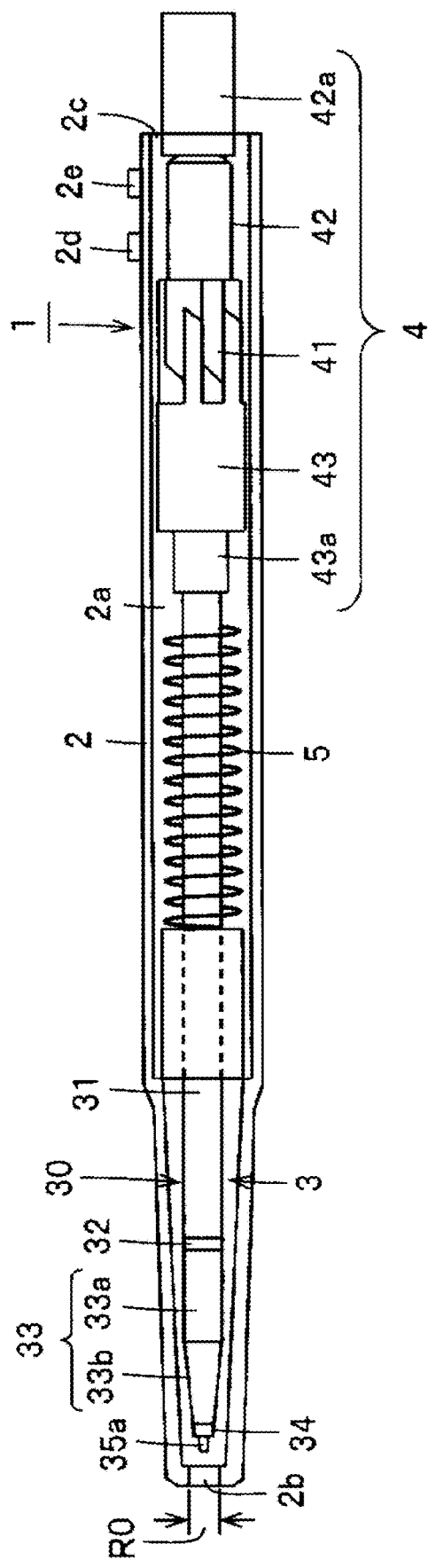
FIGS. 1A and 1B are diagrams for explaining a configuration example of an electronic pen in a first embodiment of the present invention.

Some embodiments of an electronic pen and an electronic pen main body according to the present invention are described below with reference to the accompanying drawings.

First Embodiment

An electronic pen in a first embodiment is configured to detachably hold a cartridge-type electronic pen main body inside a cylindrical housing of the electronic pen.

Some electronic pens introduced in recent years and operated by the active capacitance method are of an interactive communication type that receives signals from a position detection sensor detecting positions pointed to by the electronic pen and transmits signals in a format based on the demand of the received signals.

For this type of interactive communicative electronic pen, what is important is the location of a reception part that receives signals from the position detection sensor. In the case of the electronic pen operated by the capacitance method, signals transmitted from the position detection sensor form an electric field that can be received through capacitive coupling. A reaching distance of such signals is thus significantly small. For this reason, the reception part of the interactive communicative electronic pen needs to be located near the pen tip so as to be able to receive signals with high strength from the position detection sensor.

The electronic pen of this embodiment thus has its main body optimally configured for use in conjunction with the above-described interactive communicative electronic pen. That is, in the embodiment to be described below, the electronic pen main body includes a reception part that receives signals from the position detection sensor. The reception part is configured to have a center electrode formed of an electrically conducting material, wherein the center electrode is electrically insulated from, and surrounded up to its tip by, a peripheral electrode formed of a cylindrical conductor.

Recently, it has been proposed that the tilt angle of the electronic pen relative to a position detection sensor surface (i.e., the angle formed between the axial direction of the electronic pen and the position detection sensor surface; simply referred to as the tilt angle of the electronic pen hereunder) should be detected by a position detection apparatus and that the detected tilt angle should be reflected, for example, in the thickness and other characteristics of a pointing path (writing path) of the electronic pen. In the electronic pen main body of this embodiment, the above-described peripheral electrode is further configured for use in detecting the tilt angle of the electronic pen.

In the first embodiment, the peripheral electrode is also configured to act as a shield electrode with respect to the center electrode that transmits a position detection signal.

FIG. 1 is a set of diagrams depicting a configuration example of an electronic pen in the first embodiment of the present invention. The electronic pen 1 of the first embodiment has a hollow part 2a in a cylindrical housing 2 (called the pen housing 2 hereunder) that holds an electronic pen main body 3. A knock cam mechanical part 4 provides a knock type structure that allows the pen tip of the electronic pen main body 3 to be projected from and retracted into an opening 2b on one end side of the pen housing 2 in a longitudinal direction.

Figure 1B:
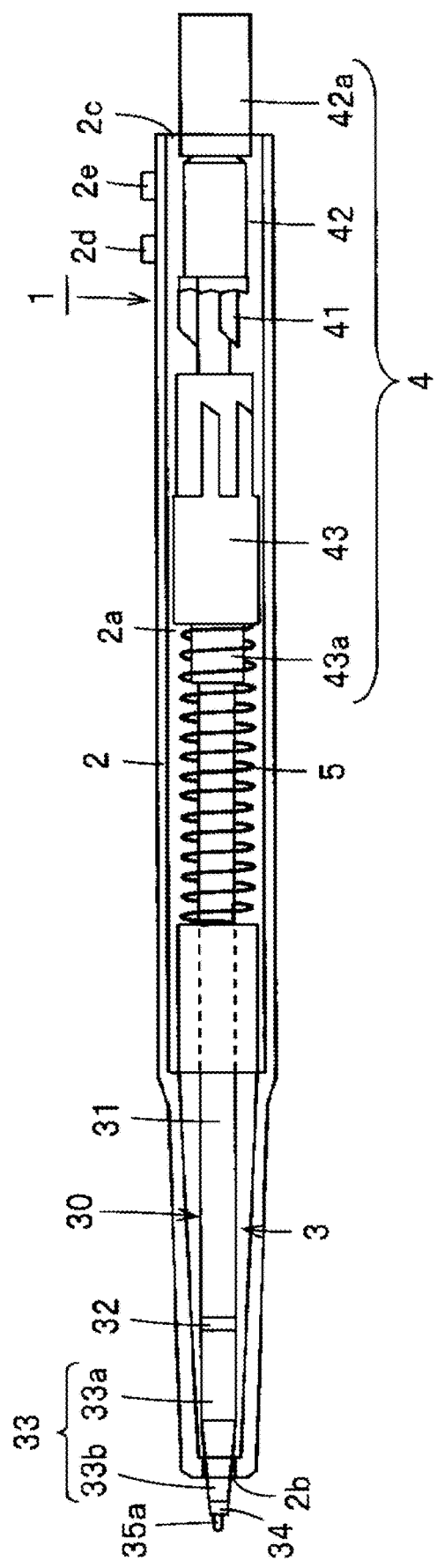

FIG. 1A depicts a state in which the electronic pen main body 3 as a whole is housed in the hollow part 2a in the pen housing 2. FIG. 1B depicts a state in which the pen tip of the electronic pen main body 3 is projected from the opening 2b of the pen housing 2 by the knock cam mechanical part 4. In the example of FIG. 1, the pen housing 2 of the electronic pen 1 is assumed to be configured with a transparent synthetic resin that allows the inside to be seen through.

The electronic pen 1 of this embodiment is configured to be replaceable with commercially available knock type ballpoint pens.

The pen housing 2 and the knock cam mechanical part 4 held therein are configured to be structurally and dimensionally identical to those of common knock type ballpoint pens that are commercially available.

As depicted in FIG. 1, the knock cam mechanical part 4 has a known configuration in which a cam main body 41, a knocking rod 42, and a rotator 43 are combined with one another. The cam main body 41 is formed on an inner wall surface of the cylindrical pen housing 2. An end part 42a of the knocking rod 42 is projected from an opening 2c opposite to the pen tip side of the pen housing 2, the knocking rod 42 thereby allowing a user to perform knocking operations on its end part 42*a*. The rotator 43 has a fitting part 43*a* fitted to the other end part of the electronic pen main body 3 opposite to its pen tip side.

It is to be noted that the fitting part 43*a* is different from that of the housing of an ordinary knock type ballpoint pen in that the fitting part 43*a* is additionally configured for electrical connection with the electronic pen main body 3. That is, as will be discussed later, the electronic pen main body 3 has an internal signal transmission circuit that generates signals to be transmitted via the center electrode or peripheral electrode to the position detection sensor, and the signal transmission circuit needs a power voltage supply.

In this embodiment, as will be discussed later, the electronic pen main body 3 includes the signal transmission circuit and an internal electrical storage element that supplies power thereto. The electrical storage element needs to be charged from outside of the electronic pen main body 3. For this purpose, the end part fitted to the fitting part 43*a* of the electronic pen main body 3 in this embodiment is furnished with a terminal conductor (electrode) connected to the above-described electrical storage element. The fitting part 43*a* thus forms a conducting body that connects with the terminal conductor connected to the electrical storage element. It is to be noted that, except for its electrical arrangements, the structure for coupling with the electronic pen main body 3 remains the same as that in which a ballpoint refill is coupled and fitted. A configuration example of the end part fitted to the fitting part 43*a* of the electronic pen main body 3 will be discussed later along with a configuration example of the fitting part 43*a*.

What makes the pen housing 2 different from that of the knock type ballpoint pen as a writing instrument is that as depicted in FIG. 1, charging electrodes 2*d* and 2*e* connected to the conductor in the fitting part 43*a* are formed on an outer peripheral side surface of the pen housing 2 opposite to the pen tip side in this example.

When the electronic pen 1 configured as described above is in the state of FIG. 1A, pressing the end part 42*a* of the knocking rod 42 causes the knock cam mechanical part 4 to lock the electronic pen main body 3 into the state of FIG. 1B in the pen housing 2, with the pen tip of the electronic pen main body 3 projected from the opening 2*b* of the pen housing 2. In the state of FIG. 1B, again pressing the end part 42*a* of the knocking rod 42 causes the knock cam mechanical part 4 to unlock the electronic pen main body 3. A return spring 5 brings the electronic pen main body 3 in the pen housing 2 back to the position in the state of FIG. 1A. The detailed configurations and the workings of the knock cam mechanical part 4 are well known and thus will not be explained further.

Embodiment of the Electronic Pen Main Body 3

Figure 2A:
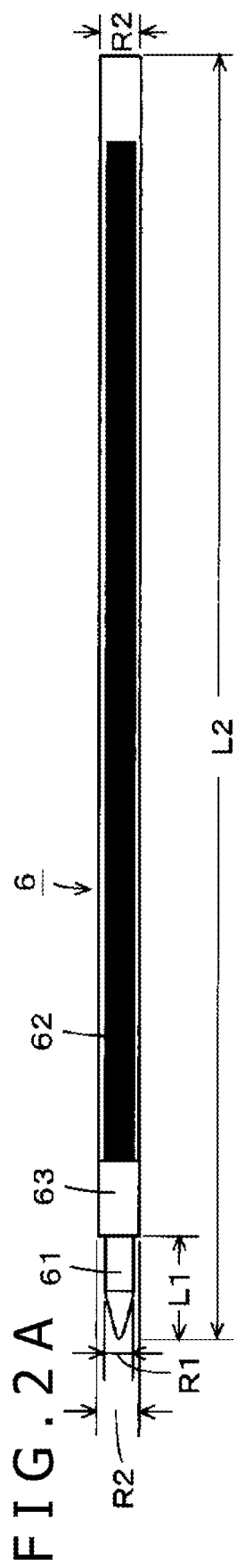
FIGS. 2A-2C are diagrams for explaining a configuration example of an electronic pen main body in the first embodiment of the present invention.
Figure 2B:
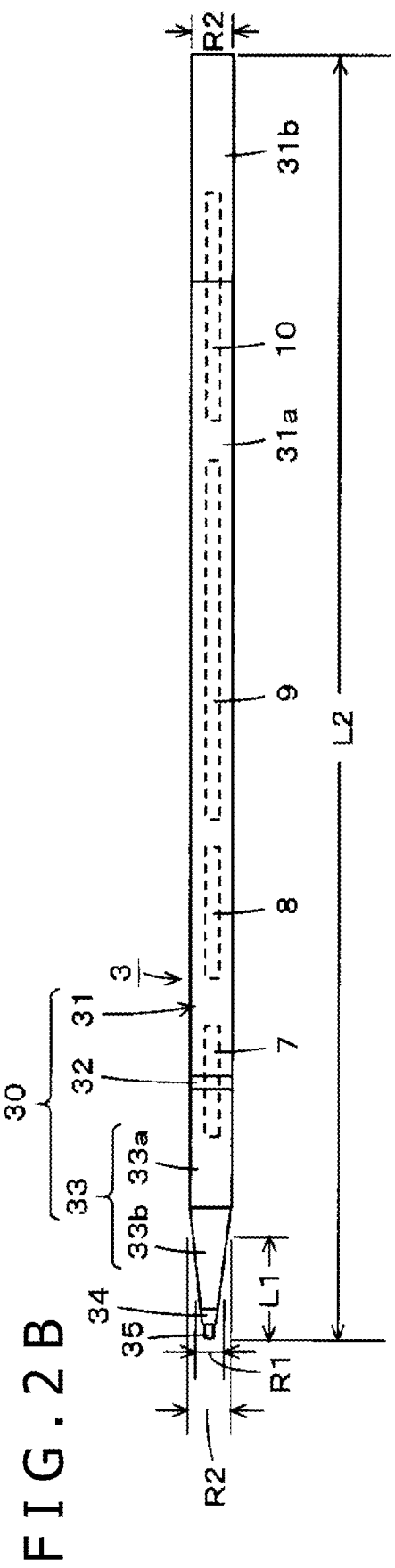

FIG. 2 is a set of diagrams depicting a configuration example of the electronic pen main body 3 in comparison with a refill of a commercially available knock type ballpoint pen. That is, FIG. 2A depicts a ballpoint refill 6 of a commercially available knock type ballpoint pen, and FIG. 2B illustrates a configuration example of the electronic pen main body 3 of this embodiment. In this embodiment, as will be discussed later, the electronic pen main body 3 is configured to be dimensionally similar to the knock ballpoint refill 6 and thus replaceable with the latter.

FIG. 3 is a set of diagrams depicting a configuration example of the pen tip side of the electronic pen main body 3 of this embodiment. FIG. 3A illustrates an appearance of the pen tip side, and FIG. 3B gives a longitudinal sectional view of the pen tip side. Also, FIG. 4 is a set of exploded perspective views for explaining a configuration example of the pen tip side of the electronic pen main body 3 in this embodiment illustrated in FIG. 3.

As depicted in FIG. 2A, the refill 6 of a commercially available knock type ballpoint pen has a known configuration in which a pen tip part 61 tipped with a ball and a cylindrical ink storage part 62 of a predetermined outer diameter are integrally coupled with each other via a cylindrical coupling part 63 of a predetermined outer diameter. The pen tip part 61 is cylindrically shaped and is tapered toward the tip end. A maximum outer diameter R1 of the pen tip part 61 is made smaller than a diameter R0 of the opening 2*b* of the pen housing 2. The coupling part 63 and the ink storage part 62 have the same outer diameter R2, which is set to be slightly larger than the maximum outer diameter R1 of the pen tip part 61. For example, the outer diameter R2 is set to be 2.2 millimeters. It is to be noted that the diameter R0 of the opening 2*b* of the pen housing 2 is subject to the dimensional relations of R1<R0<R2.

As depicted in FIG. 2B and in FIGS. 3A and 3B, the electronic pen main body 3 of this embodiment has a housing 30 (called the main body housing 30 hereunder) configured in such a manner that the pen tip side of a main body cylindrical part 31 is coupled with a peripheral electrode 33 made of a conductive member, such as conductive metal, via a cylindrical coupling member 32.

In this example, as depicted in FIG. 2B, the main body cylindrical part 31 is configured with a resin pipe part 31*b* coupled with a metal pipe part 31*a* at the rear end side opposite to the pen tip side. In the main body cylindrical part 31 of this example, the pen tip side of the metal pipe part 31*a* is coupled with the peripheral electrode 33 via the cylindrical coupling member 32. The cylindrical coupling member 32 also functions as an insulator between the metal pipe part 31*a* and the peripheral electrode 33. The end part of the electronic pen main body 3 on the side of the resin pipe part 31*b* forms a fitting part fitted to the fitting part 43*a* in the pen housing 2.

In this example, as depicted in FIGS. 2 and 3, the peripheral electrode 33 is shaped to have a cylindrical shaped part 33*a* of the predetermined outer diameter R2 and a tapered part 33*b* tapered toward the pen tip side. The metal pipe part 31*a* of the main body cylindrical part 31 has a cylindrical shape with the same outer diameter as the outer diameter R2 of the cylindrical shaped part 33*a* of the peripheral electrode 33.

The cylindrical coupling member 32 is constituted by an insulating material, which is a resin in this example. The cylindrical coupling member 32 is a cylindrical body as depicted in FIG. 3B. Approximately in the middle of an outer peripheral surface of the cylindrical coupling member 32 in the axial direction, there is a ring-shaped flange part 32F projected from the outer peripheral surface in a direction perpendicular to the axial direction. The ring-shaped flange part 32F has a predetermined width W (see FIG. 3) in the axial direction. The edge face of the flange part 32F is configured to be an integral part of the main body housing 30 flush with the main body cylindrical part 31 and the peripheral electrode 33 with no level differences therebetween, as depicted in FIGS. 3A and 3B. That is, the outer periphery diameter of the ring-shaped flange part 32F is selected to be the same as the outer diameter of the peripheral electrode 33 and of the metal pipe part 31*a* of the main body cylindrical part 31.

The cylindrical coupling member 32 on the pen tip side of the ring-shaped flange part 32F in the axial direction forms a first cylindrical fitting part 32*a* fitted to the cylindrical shaped part 33*a* of the peripheral electrode 33. The outer diameter of the first cylindrical fitting part 32a of the cylindrical coupling member 32 is made equal to or slightly smaller than the inner diameter of the cylindrical shaped part 33a of the peripheral electrode 33. The cylindrical shaped part 33a of the peripheral electrode 33 is configured to be pressed in up to the ring-shaped flange part 32F and coupled with the first cylindrical fitting part 32a of the cylindrical coupling member 32.

The cylindrical coupling member 32 on the rear end side of the ring-shaped flange part 32F in the axial direction forms a second cylindrical fitting part 32b fitted to the metal pipe part 31a of the main body cylindrical part 31. The outer diameter of the second cylindrical fitting part 32b of the cylindrical coupling member 32 is made equal to or slightly smaller than the inner diameter of the metal pipe part 31a of the main body cylindrical part 31. The metal pipe part 31a of the main body cylindrical part 31 is configured to be pressed in up to the ring-shaped flange part 32F and coupled with the second cylindrical fitting part 32b of the cylindrical coupling member 32.

In the state where the metal pipe part 31a of the main body cylindrical part 31 and the peripheral electrode 33 are inserted in and fitted to the cylindrical coupling member 32, a single cylindrical main body housing 30 is formed as depicted in FIG. 2B and in FIGS. 1A and 1B. At this point, as discussed above, the outer peripheral surface of the metal pipe part 31a of the main body cylindrical part 31, the outer peripheral surface of the peripheral electrode 33, and the edge face of the ring-shaped flange part 32F of the cylindrical coupling member 32 are flush with each other. The metal pipe part 31a of the main body cylindrical part 31 and the peripheral electrode 33, both made of an electrically conducting material, are electrically separated (i.e., insulated) from each other with no contact therebetween due to the presence of the ring-shaped flange part 32F of the cylindrical coupling member 32.

Inside the main body housing 30 is a hollow part 30a as depicted in FIG. 3B. The pen tip side of the peripheral electrode 33 of the main body housing 30 is fitted with a front cap 34 made of an insulating material, as depicted in FIG. 2B and in FIGS. 3A and 3B. The front cap 34 has, at its tip, an opening 34a (see FIG. 3B) with a diameter larger than the diameter of a center electrode 35. The opening 34a communicates with the hollow part 30a of the main body housing 30.

The center electrode 35 forms the stylus of the electronic pen main body 3 of this embodiment. In this example, the center electrode 35 is a conductive member, which is formed of a conductive metal. As depicted in FIG. 3B, the center electrode 35 is inserted from the opening 34a of the front cap 34 into the main body housing 30 in such a manner that the end part opposite to the pen tip side is detachably fitted to a stylus holding member 7, to be described later.

The stylus 35 and the peripheral electrode 33, both made of an electrically conducting material, are electrically separated (i.e., insulated) from each other by the front cap 34 as an insulating material, as depicted in FIG. 3B. In the electronic pen main body 3 of this embodiment, with the center electrode 35 attached thereto, the peripheral electrode 33 is arranged to surround the center electrode 35 on the rear end side thereof away from a pen tip part 35a forming the pen tip of the center electrode 35, as depicted in FIG. 3B. It is to be noted that, in the description that follows, the center electrode 35 will be referred to as the stylus 35.

In this example, as depicted in FIGS. 2A and 2B, the pen tip side of the electronic pen main body 3 is configured to be approximately equal dimensionally to the pen tip side of the ballpoint refill 6. That is, the outer diameter of the main body cylindrical part 31 in the main body housing 30 and the diameter of the cylindrical shaped part 33a of the peripheral electrode 33 are each equal to the outer diameter R2 of the ink storage part 62 and coupling part 63 of the refill 6 in a commercially available knock type ballpoint pen, as depicted in FIG. 2B.

The tapered part 33b of the peripheral electrode 33 of the main body housing 30 on the tip side thereof is gradually tapered toward the pen tip. In this embodiment, as depicted in FIG. 2B, the pen tip side of the tapered part 33b away from the approximate middle thereof in the axial direction is arranged not to exceed the diameter R0 of the opening 2b of the pen housing 2 on the pen tip side.

With the stylus 35 inserted in and fitted to the electronic pen main body 3 through the opening 34a of the front cap 34, the length from the tip of the stylus 35 to the position where the outer diameter of the tapered part 33b of the peripheral electrode 33 attains the diameter R1 is arranged to be approximately equal to a length L1 of the pen tip part 61 of the refill 6 of a commercially available knock type ballpoint pen in the axial direction.

The length (total length) of the electronic pen main body 3 with the stylus 35 attached thereto is selected to be equal to a total length L2 of the ballpoint refill 6, as depicted in FIGS. 2A and 2B.

The electronic pen main body 3 configured as described above is housed in the pen housing 2 when the main body cylindrical part 31 is fitted to the fitting part 43a of the rotator 43 in the knock cam mechanical part 4. With the electronic pen 1 of this embodiment, the user presses the end part 42a of the knocking rod 42 when used in conjunction with a position detection apparatus. The pressing action causes the electronic pen 1 to extend, from the opening 2b of the pen housing 2, the pen tip part 35a of the stylus 35, a portion of the front cap 34, and a portion of the tapered part 33b of the peripheral electrode 33 on the pen tip side, as depicted in FIG. 1B.

That is, this embodiment is configured in such a manner that not only the tip of the stylus 35 attached to the electronic pen main body 3 but also a portion of the pen tip side of the peripheral electrode 33 surrounding the stylus 35 is projected outside from the opening 2b of the pen housing 2 of the electronic pen 1, as depicted in FIG. 1B. In this state, the user of the electronic pen 1 performs input operations to point to desired positions on the position detection sensor of the position detection apparatus.

After using the electronic pen 1, the user can again press the end part 42a of the knocking rod 42 to bring the entire electronic pen main body 3 into the hollow part 2a of the pen housing 2, as depicted in FIG. 1A. At this point, the electronic pen main body 3 as a whole is accommodated inside the hollow part 2a of the pen housing 2 in such a manner that the pen tip part 35a of the stylus 35 in the electronic pen main body 3 is protected by the pen housing 2.

Inside the hollow part 30a of the main body housing 30, as indicated by dotted lines in FIG. 2B and in FIG. 3A, there are provided the stylus holding member 7, a writing pressure detection part 8, a printed-circuit board 9 including a signal transmission circuit, and a capacitor 10 as a typical electrical storage element for supplying power voltage, arranged in that order away from the pen tip side in the axial direction.

In this embodiment, the hollow part 30a of the main body housing 30 holds a substrate holder 300 having a substrate placing table 301 on which the printed-circuit board 9 is placed, as depicted in FIG. 3B.

The substrate holder 300 is formed of an insulating resin. In the longitudinal direction of the electronic pen main body 3, i.e., in the axial direction thereof, the substrate holder 300 has a writing pressure detection part holder 302 that holds the writing pressure detection part 8 on the opposite side of the substrate placing table 301. As depicted in FIG. 3B, the substrate holder 300 in the hollow space of the main body housing 30 is configured in such a manner that the writing pressure detection part holder 302 and the substrate placing table 301 are arranged continuously in the longitudinal direction of the electronic pen main body 3, i.e., in the axial direction thereof. The writing pressure detection part holder 302 has a cylindrical shape with an internal hollow space that holds multiple components of the writing pressure detection part 8. The substrate placing table 301 is shaped like a boat on which the printed-circuit board 9 is placed and retained. As such, the substrate placing table 301 is shaped as if a cylindrical body were cut approximately in half in the axial direction.

The substrate holder 300 is held inside the main body housing 30 in such a manner that the writing pressure detection part holder 302 is oriented toward the pen tip side. The writing pressure detection part 8 retained by the writing pressure detection part holder 302 is coupled with a stylus holding member 7 fitted to the stylus 35 to hold it in such a manner that the pressure (i.e., writing pressure) applied to the stylus 35 is transmitted to the writing pressure detection part 8.

In this embodiment, the outer diameter of the writing pressure detection part holder 302 of the substrate holder 300 is selected to be equal to or slightly smaller than the outer diameter of the second cylindrical fitting part 32b of the cylindrical coupling member 32. As depicted in FIG. 3B, a portion of the writing pressure detection part holder 302 in the substrate holder 300 is fitted to a portion of the second cylindrical fitting part 32b of the cylindrical coupling member 32. This allows the writing pressure detection part holder 302 of the substrate holder 300 to be coupled with the second cylindrical fitting part 32b of the cylindrical coupling member 32.

As depicted in FIG. 3B, the substrate holder 300 is positionally restricted from moving in the axial direction in the main body housing 30 when the writing pressure detection part holder 302 is fitted to and coupled with the second cylindrical fitting part 32b of the cylindrical coupling member 32 in the axial direction.

Although not illustrated, on the substrate placing table 301 of the substrate holder 300, both ends of the capacitor 10 disposed on the opposite side of the writing pressure detection part holder 302 are electrically connected with a copper foil pattern comprising the power supply line and the ground line of the printed-circuit board 9. This allows the voltage of the capacitor 10 to be supplied as a power supply voltage to the circuits formed on the printed-circuit board 9.

In this embodiment, the metal pipe part 31a of the main body cylindrical part 31 made of an electrically conducting material is connected electrically with the copper foil pattern of the ground line of the printed-circuit board 9.

In this embodiment, the printed-circuit board 9 includes a circuit section constituted by an IC (Integrated Circuit) 100 (see FIGS. 3A and 3B) and by peripheral circuit components thereof. The IC 100 forms a signal transmission circuit generating signals to be output from the stylus 35 and peripheral electrode 33, and a control circuit controlling the signal transmission from the signal transmission circuit to the stylus 35 and peripheral electrode 33. Although not depicted, the peripheral circuit section includes a charging circuit for the capacitor 10. The charging circuit for the capacitor 10 may alternatively be provided outside of the electronic pen 1.

The stylus holding member 7 fitted to and holding the stylus 35 is configured with a conductive elastic member 71, a stylus holder 72, a coil spring 73, and a conductor terminal member 74 as depicted in FIG. 3B and in FIG. 4. In this embodiment, as depicted in FIG. 3B, the stylus 35 is fitted to and held by the stylus holder 72, which is made of an electrically conducting material, via the conductive elastic member 71. The stylus holding member 7 also functions as a transmission member transmitting the writing pressure applied to the stylus 35 to the writing pressure detection part 8.

With the stylus holder 72 fitted to a holding member 83 of the writing pressure detection part 8 held by the writing pressure detection part holder 302, the pressure (i.e., writing pressure) applied to the stylus 35 is transmitted to the writing pressure detection part 8. In this case, the stylus holder 72 is continuously pressed against the substrate holder 300 toward the stylus 35 by a coil spring 73. The coil spring 73, which is interposed between the stylus holder 72 and the substrate holder 300, is an elastic member formed of an electrically conducting material such as a conductive metal. Incidentally, the coil spring 73, along with the conductor terminal member 74, constitutes an electrical connection member for transmitting to the stylus 35 the signals from the IC 100 disposed on the printed-circuit board 9.

FIG. 4A is an exploded perspective view depicting the stylus 35, the conductive elastic member 71, the coil spring 73, the conductor terminal member 74, and the writing pressure detection part holder 302 of the substrate holder 300.

The conductive elastic member 71, typically made of a conductive rubber, is formed in a cylindrical shape with a through-hole 71a into which the end part of the stylus 35 opposite to its pen tip part 35a is fitted. A portion of the conductive elastic member 71 on the side of the stylus 35 is smaller in outer diameter and thinner-walled than the remaining portion. Also, this portion of the conductive elastic member 71 constitutes a grip part 711 with a slit 712 formed therein to readily grip the stylus 35.

In the above-described configuration, the stylus 35 is gripped by two thin-walled arcuate portions with the slit 712 formed thereby in the grip part 711. This allows the stylus 35 to be readily inserted into the grip part 711 of the conductive elastic member 71. When pulled by a predetermined force, the stylus 35 is easily extracted from the conductive elastic member 71.

The stylus holder 72 is made of an electrically conducting material such as SUS (Steel Special Use Stainless). The stylus holder 72 is formed by an integral combination of a holder fitting part 721 and a rod-like part 722. The holder fitting part 721 has a recessed hole 721a for holding and fitting the conductive elastic member 71. The rod-like part 722 is fitted to the holding member 83, to be discussed later, of the writing pressure detection part 8.

After the conductive coil spring 73 is attached to the rod-like part 722 of the stylus holder 72 holding the conductive elastic member 71 as described above, the rod-like part 722 of the stylus holder 72 is fitted to the holding member 83 of the writing pressure detection part 8 held by the writing pressure detection part holder 302 of the substrate holder 300.

In this case, for the electronic pen main body 3 of this embodiment, it is necessary to consider that the transmission signal generated by circuits on the printed-circuit board 9 needs to be supplied to the stylus 35. However, since the holding member 83 of the writing pressure detection part 8 held in the writing pressure detection part holder 302 of the substrate holder 300 is made of an insulating resin, no electrical connection can be established between the stylus holder 72 and the holding member 83.

Thus, in this embodiment, an electrical connection member is constituted by the coil spring 73 made of an electrically conducting material and interposed between the stylus holder 72 and the writing pressure detection part holder 302 of the substrate holder 300, and by the conductor terminal member 74 disposed in the writing pressure detection part holder 302 of the substrate holder 300. This electrical connection member establishes electrical connection enabling the supply of signals from the signal transmission circuit on the printed-circuit board 9.

That is, in this embodiment, the writing pressure detection part holder 302 of the substrate holder 300 is furnished with the conductor terminal member 74 made of an electrically conducting material such as SUS, in such a manner that the conductor terminal member 74 covers an opening 302a through which the rod-like part 722 of the stylus holder 72 is inserted, as depicted in FIG. 4A.

The conductor terminal member 74 has an abutting plate part 741 with a through-hole 741a covering the opening 302a of the writing pressure detection part holder 302 of the substrate holder 300, wherein the through-hole 741a allows the rod-like part 722 of the stylus holder 72 to be inserted, as depicted in FIGS. 4A and 4B.

An extension part 742 spanning the writing pressure detection part holder 302 of the substrate holder 300 is extended up to the substrate placing table 301. In the state where the conductor terminal member 74 is attached to the writing pressure detection part holder 302 of the substrate holder 300, a terminal part 742a at the end of the extension part 742 extended from the conductor terminal member 74 abuts against and is, for example, soldered to a conductor on the back side of the printed-circuit board 9 disposed on the substrate placing table 301 of the substrate holder 300, as depicted in FIG. 3B. This provides electrical connection between the conductor terminal member 74 and the signal transmission circuit disposed on the printed-circuit board 9.

The rod-like part 722 of the stylus holder 72 fitted with the conductive elastic member 71 is inserted via the through-hole 741a of the abutting plate part 741 of the conductor terminal member 74 into the hollow space of the writing pressure detection part holder 302 of the substrate holder 300. The rod-like part 722 is fitted to the writing pressure detection part holder 302 with the coil spring 73 interposed therebetween. The inner diameter of the coil spring 73 is made larger than the outer diameter of the rod-like part 722 of the stylus holder 72.

The coil spring 73 thus comes into elastic contact with the stylus holder 72, and abuts against the abutting plate part 741 of the conductor terminal member 74 for elastic contact therewith. Because the coil spring 73 is formed by an electrically conducting material and because the conductive elastic member 71 and the stylus holder 72 are both conductive, the conductive elastic member 71 fitted to the stylus holder 72 is connected electrically to the circuit section on the printed-circuit board 9 via the coil spring 73 and the conductor terminal member 74.

The stylus 35 is inserted in and fitted to the through-hole 71a of the conductive elastic member 71 fitted to the stylus holder 72 housed in the main body housing 30 as described above. The stylus 35 is thus held in the stylus holder 72 via the conductive elastic member 71. In this state, the stylus 35 is electrically connected to the signal transmission circuit on the printed-circuit board 9. The stylus 35 is thus supplied with signals coming from the signal transmission circuit.

Explained next is how the writing pressure detection part holder 302 of the substrate holder 300 and the writing pressure detection part 8 are configured, along with how the holding member 83 of the writing pressure detection part 8 is fitted to the stylus holder 72.

A writing pressure detection module is formed by the writing pressure detection part 8 being held in the writing pressure detection part holder 302 as depicted in FIG. 3B. When the stylus 35 is coupled to the writing pressure detection module via the stylus holder 72, the writing pressure applied to the pen tip part 35a of the stylus 35 is detected by the writing pressure detection part 8 in the writing pressure detection module. In this case, the writing pressure detection module detects the writing pressure when some of the components of the writing pressure detection part 8 constituting the module are axially moved together with the stylus 35 and the stylus holder 72.

The writing pressure detection part 8 of this example uses a variable capacitor of which the capacitance varies with the writing pressure applied to the stylus 35. As depicted in FIG. 3B, the writing pressure detection part 8 is formed of multiple components including a dielectric body 81, a terminal member 82, a holding member 83, a conductive member 84, and an elastic member 85.

In the state where the stylus holder 72 is fitted to the writing pressure detection part holder 302 of the substrate holder 300 as described above, the stylus 35 is pressed into the through-hole 71a of the conductive elastic member 71 fitted to the stylus holder 72. This causes the stylus 35 to be securely held in the stylus holder 72 by means of the conductive elastic member 71 as discussed above. It is to be noted that, in the state in which the stylus 35 is fitted to and held by the stylus holder 72, it is possible to extract the stylus 35 in the direction of the pen tip part 35a for replacement as explained above.

In the electronic pen main body 3, a pressure applied to the pen tip part 35a of the stylus 35 causes the stylus 35 to be axially displaced toward the rear end side in keeping with the pressure. The displacement in turn causes the holding member 83 in the writing pressure detection part holder 302 to be displaced toward the dielectric body 81 against a biasing force of the elastic member 85. As a result, the conductive member 84 fitted to the holding member 83 is displaced toward the dielectric body 81. A distance between the conductive member 84 and the dielectric body 81, as well as the contact area therebetween, varies according to the pressure applied to the stylus 35.

Consequently, the capacitance of the variable capacitor formed between the terminal member 82 constituting a first electrode on one hand and the conductive member 84 constituting a second electrode on the other hand varies with the pressure applied to the stylus 35. Changes in the capacitance of the variable capacitor are detected by the IC 100 disposed on the printed-circuit board 9, thus allowing the writing pressure to be detected.

It is to be noted that the configuration of the writing pressure detection part 8 is not limited to what has been described above. Alternatively, the writing pressure detection part 8 may utilize a variable capacitor configured with a semiconductor chip made of MEMS (Micro Electro Mechanical Systems) elements (e.g., see Patent Document (Japanese Patent Laid-Open No. 2013-161307)).

Explained next is the electrical connection between the peripheral electrode 33 and the circuit section of the printed-circuit board 9. The outer peripheral surface of the cylindrical coupling member 32 has a recessed groove (not depicted) formed in the axial direction of the cylindrical coupling member 32 extending from the first cylindrical fitting part 32a to the second cylindrical fitting part 32b past the underside of the ring-shaped flange part 32F.

The outer peripheral side surface of the writing pressure detection part holder 302 in the substrate holder 300 also has a recessed groove (not depicted) formed to continue from the recessed groove of the second cylindrical fitting part 32b. In this continuous recessed groove, a connection terminal conductor 11 made of an electrically conducting material, such as a conductive metal in this example, is disposed as depicted in FIG. 3B. An end part 11a of the connection terminal conductor 11 placed in the recessed groove of the cylindrical coupling member 32 on the side of the first cylindrical fitting part 32a is slightly swelled at least partially from the outer peripheral surface of the first cylindrical fitting part 32a, as depicted in FIG. 3B. It is to be noted that the recessed groove at the end part 11a is formed at a depth such that the end part 11a can be elastically pushed down when pressed from above.

As a result, when the peripheral electrode 33 is fitted to the first cylindrical fitting part 32a of the cylindrical coupling member 32, the end part 11a of the connection terminal conductor 11 comes into secure contact with the inner wall of the peripheral electrode 33. This establishes electrical connection between the peripheral electrode 33 and the connection terminal conductor 11. As depicted in FIG. 3B, an end part 11b of the connection terminal conductor 11 extending toward the printed-circuit board 9 is electrically connected to the back side 9b of the printed-circuit board 9. Although not illustrated, the end part 11b of the connection terminal conductor 11 is electrically connected via through-holes to the circuit section of the printed-circuit board 9 on the front side thereof.

It is to be noted that the recessed groove in which the connection terminal conductor 11 is disposed has a depth such that when the metal pipe part 31a of the main body cylindrical part 31 is fitted to the second cylindrical fitting part 32b, the connection terminal conductor 11 and the metal pipe part 31a are not in contact with each other. Alternatively, an insulating material may be interposed between the connection terminal conductor 11 and the metal pipe part 31a.

Figure 2C:
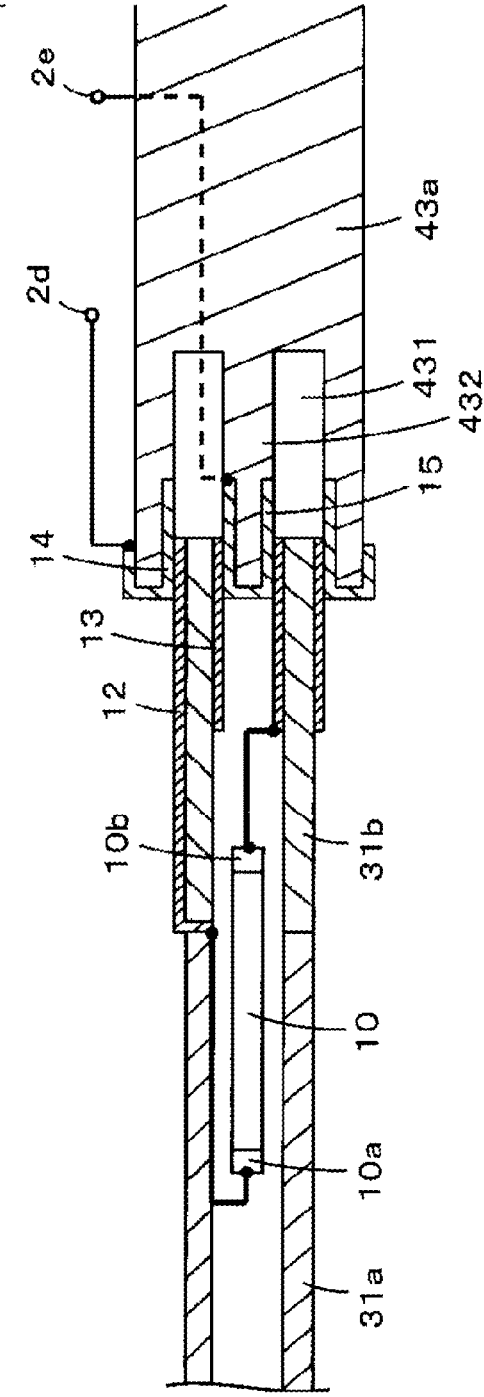

Explained next with reference to FIG. 2C is a configuration example regarding the rear end side of the electronic pen main body 3 opposite to the pen tip side and the fitting part 43a of the main body housing 30. In this example, a resin pipe part 31b forms the side of the main body cylindrical part 31 of the main body housing 30, wherein the side is fitted to the fitting part 43a of the rotator 43 in the knock cam mechanical part 4 of the pen housing 2 of the electronic pen 1. The resin pipe part 31b is furnished with a pair of terminal conductors connected to both ends of the capacitor 10. A corresponding pair of conductors are formed on the fitting part 43a of the rotator 43 in the knock cam mechanical part 4 of the pen housing 2 of the electronic pen 1. The paired conductors are electrically connected to the charging electrodes 2d and 2e formed, in this example, on the outer peripheral side surface of the pen housing 2 opposite to the pen tip side.

FIG. 2C is an enlarged sectional view for explaining a configuration in which the resin pipe part 31b of the main body cylindrical part 31 of the electronic pen main body 3 is coupled with the fitting part 43a of the main body cylindrical part 31 of the main body housing 30.

As depicted in FIG. 2C, the fitting part 43a has a cylindrical recessed part 431 fitted with the resin pipe part 31b. A center portion of the cylindrical recessed part 431 is furnished with a center rod-like part 432 inserted into a hollow space of the resin pipe part 31b. In this example, the diameter of the cylindrical recessed part 431 of the fitting part 43a is made slightly larger than the outer diameter of the resin pipe part 31b in such a manner that when the resin pipe part 31b is fitted to the fitting part 43a, the outer peripheral side surface of the resin pipe part 31b comes into contact with the inner wall surface of the cylindrical recessed part 431 of the fitting part 43a. Furthermore, this configuration is such that when the resin pipe part 31b is fitted to the fitting part 43a, an inner peripheral side surface of the resin pipe part 31b comes into contact with an outer peripheral side surface of the center rod-like part 432 in the cylindrical recessed part 431 of the fitting part 43a.

As depicted in FIG. 2C, a terminal conductor 12 is deposited on the outer peripheral side surface of the resin pipe part 31b of the main body cylindrical part 31, wherein the terminal conductor 12 is electrically connected to one electrode terminal 10a of the capacitor 10 housed in the main body cylindrical part 31. A terminal conductor 13 is deposited on the inner wall surface of the resin pipe part 31b of the main body cylindrical part 31, wherein the terminal conductor 13 is electrically connected to the other electrode terminal 10b of the capacitor 10. The terminal conductors 12 and 13 are electrically disconnected from each other.

Meanwhile, a conductor 14 is formed on the inner wall surface of the cylindrical recessed part 431 of the fitting part 43a, wherein the conductor 14 is electrically connected to the charging electrode 2d provided in the pen housing 2. A conductor 15 is formed on the outer peripheral side surface of the center rod-like part 432 in the cylindrical recessed part 431 of the fitting part 43a, wherein the conductor 15 is connected to the charging electrode 2d provided in the pen housing 2. The conductors 14 and 15 are electrically disconnected from each other.

In this case, the terminal conductors 12 and 13 of this example are formed all over the outer peripheral side surface and inner wall surface. The conductors 14 and 15 of the fitting part 43a are also formed all over the inner wall surface of the cylindrical recessed part 431 and over the entire outer peripheral side surface of the center rod-like part 432. This makes it possible for the terminal conductors 12 and 13 of the electronic pen main body 3 and the conductors 14 and 15 of the fitting part 43a to be electrically connected with each other when the end part of the resin pipe part 31b in the main body cylindrical part 31 of the electronic pen main body 3 is fitted to the fitting part 43a, regardless of the rotation angle at which the fitting is made. Incidentally, it is not necessary for the conductors 12, 13, 14, and 15 to be formed over the entire circumference in the circumferential direction. Regardless of the rotation angle at which the fitting is established, the terminal conductors 12 and 13 of the electronic pen main body 3 and the conductors 14 and 15 of the fitting part 43a are allowed to have some missing portions in their circumferential direction as long as they are electrically connected with each other.

In the above configuration in which the electronic pen main body 3 is fitted to the fitting part 43a of the rotator 43 in the knock cam mechanical part 4 of the pen housing 2 of the electronic pen 1, both ends of the capacitor 10 housed in the electronic pen main body 3 are connected with the charging electrodes 2d and 2e of the pen housing 2 of the electronic pen 1. This allows the capacitor 10, when devoid of stored supply power voltage, to be charged with a sufficient supply power voltage via the charging electrodes 2d and 2e.

Electronic Circuit Configuration Example of the Electronic Pen Main Body 3

FIG. 5 depicts an electrical configuration example of the electronic pen main body 3 of this embodiment. In this example, as depicted in FIG. 5, the IC 100 disposed on the printed-circuit board 9 constitutes a control circuit 101. The control circuit 101 is connected with a signal transmission circuit 102 and a signal reception circuit 103. The control circuit 101 is further connected with a variable capacitor 8C formed by the writing pressure detection part 8. The variable capacitor 8C is connected in parallel with a resistor 8R.

A signal output end of the signal transmission circuit 102 is connected to the stylus 35 via a switch circuit 104. In this case, the conductor terminal member 74, the stylus holder 72, and the conductive elastic member 71 are interposed between the stylus 35 and the switch circuit 104 as described above.

Also in this example, the signal output end of the signal transmission circuit 102 is connected to a terminal S of a selector switch circuit 105. A movable terminal M of the selector switch circuit 105 is connected to the peripheral electrode 33. In this case, the connection terminal conductor 11 is interposed between the peripheral electrode 33 and the selector switch circuit 105.

A terminal R of the selector switch circuit 105 is connected to an input end of the signal reception circuit 103. Also, a terminal G of the selector switch circuit 105 is connected to an earth electrode (ground electrode).

The control circuit 101 supplies the switch circuit 104 with a control signal SW1 that turns the switch circuit 104 on and off. The control circuit 101 supplies the selector switch circuit 105 with a switching control signal SW2 that connects the movable terminal M selectively to the terminal S, to the terminal R, or to the terminal G.

It is to be noted that, although not depicted, the voltage of the capacitor 10 is supplied as the supply power voltage to each of the control circuit 101, the signal transmission circuit 102, the signal reception circuit 103, the switch circuit 104, and the selector switch circuit 105.

The signal reception circuit 103 processes a signal received by the peripheral electrode 33 through capacitive coupling (i.e., capacitive coupling) with the position detection sensor of the position detection apparatus. The signal reception circuit 103 performs processing such as demodulation on the received signal, and forwards the processed signal to the control circuit 101.

The control circuit 101 analyzes the signal from the signal reception circuit 103 to determine the specifications of the position detection apparatus, and determines the timing for signal interaction with the position detection sensor of the position detection apparatus. The control circuit 101 then controls the format of the signal to be output from the signal transmission circuit 102 in such a manner that the signal format matches the specifications of the position detection apparatus, and interacts with the position detection sensor at the determined timing.

Basically, the signal transmission circuit 102 outputs two kinds of signals under control of the control circuit 101: a position detection signal (burst signal) having a predetermined frequency for position detection by the position detection apparatus, and a signal that includes writing pressure information reflecting the writing pressure detected by the writing pressure detection part 8. The signal transmission circuit 102 also outputs a signal used to detect the tilt angle of the electronic pen 1. That is, under control of the control circuit 101, the signal transmission circuit 102 outputs the burst signal for position detection and the burst signal for detection of the tilt angle of the electronic pen 1.

During the period in which the signal transmission circuit 102 is outputting the burst signal for position detection, the control circuit 101 performs operations to detect the writing pressure based on the capacitance of the variable capacitor 8C formed by the writing pressure detection part 8.

In this example, the control circuit 101 first charges the variable capacitor 8C to full capacity. Thereafter, with the charging stopped, the variable capacitor 8C is left to discharge through the resistor R. The time is then measured from the point in time at which the discharging is started to the point in time at which the voltage across the variable capacitor 8C reaches a predetermined voltage level. On the basis of the measured time, the capacitance of the variable capacitor 8C at this point in time is detected. Since the capacitance of the variable capacitor 8C corresponds to the writing pressure applied to the stylus 35 at the point, the writing pressure is detected on the basis of the detected capacitance.

The control circuit 101 converts the detected writing pressure to a multiple-bit digital signal in this example. The control circuit 101 controls the signal transmission circuit 102 to output writing pressure information reflecting the digital signal.

In this embodiment, as depicted in FIG. 6A, the control circuit 101 in a steady state puts the electronic pen main body 3 into signal reception mode in which to receive signals from the position detection sensor of the position detection apparatus. In the signal reception mode, the control circuit 101 verifies reception of the signal from the position detection apparatus and, after performing the above-mentioned predetermined processing, switches the electronic pen main body 3 to signal transmission mode in which to transmit the signals to the position detection apparatus.

In signal reception mode of this embodiment, the control signal SW1 (see FIG. 6C) from the control circuit 101 turns off the switch circuit 104. The switching control signal SW2 from the control circuit 101 controls the selector switch circuit 105 to connect its movable terminal M to the terminal R (see FIG. 6D).

As a result, in the signal reception mode, the signal received by the peripheral electrode 33 from the position detection apparatus is supplied to the signal reception circuit 103 via the selector switch circuit 105 for demodulation. The received signal thus demodulated is fed to the control circuit 101. The control circuit 101 performs the process of analyzing the received signal from the position detection apparatus so as to determine the specifications of the position detection apparatus, as described above.

In this embodiment, the received signal from the position detection apparatus includes information designating the timing at which the electronic pen main body 3 is to start signal transmission. On the basis of the timing-designating information, the control circuit 101 determines the timing for switching from signal reception mode to signal transmission mode, and carries out processes such as setting of the timing for time-division processing in signal transmission mode. Thereafter, the control circuit 101 causes the electronic pen main body 3 to switch from signal reception mode to signal transmission mode.

In signal transmission mode of this embodiment, as depicted in FIG. 6B, two periods are executed on a time-division basis: a position detection period Ta in which the burst signal for position detection and the writing pressure detection information are transmitted to the position detection apparatus, and a tilt detection period Tb in which the tilt angle of the electronic pen 1 is detected.

In the position detection period Ta, the control signal SW1 (see FIG. 6C) turns on the switch circuit 104, and the switching control signal SW2 causes the selector switch circuit 105 to connect the movable terminal M to the terminal G (see FIG. 6D). As a result, in the position detection period Ta, the peripheral electrode 33 is connected to the ground electrode via the selector switch circuit 105. In the position detection period Ta, the control circuit 101 controls the signal transmission circuit 102 to output both the burst signal for position detection and the writing pressure information. The position detection signal and the writing pressure information output from the signal transmission circuit 102 are supplied to the stylus 35 via the switch circuit 104, before being transmitted to the position detection sensor. In this case, the control circuit 101 causes the signal transmission circuit 102 to transmit from the stylus 35 the writing pressure information at the end of a burst signal transmission period.

At this point, the peripheral electrode 33 is connected to the ground electrode. This allows the stylus 35 to be shielded except for its pen tip part 35a. As a result, the signal from the signal transmission circuit 102 is transmitted from the pen tip part 35a of the stylus 35 without being affected externally.

Next in the tilt detection period Tb, the control signal SW1 (see FIG. 6C) turns off the switch circuit 104, and the switching control signal SW2 causes the selector switch circuit 105 to connect the movable terminal M to the terminal S (see FIG. 6D). In the tilt detection period Tb, the control circuit 101 controls the signal transmission circuit 102 to output the burst signal for tilt detection. In this example, the tilt detection burst signal has the same frequency as that of the position detection burst signal.

In the tilt detection period Tb, the tilt detection burst signal from the signal transmission circuit 102 is thus supplied to the peripheral electrode 33 via the selector switch circuit 105, before being transmitted to the position detection sensor. Upon reception of the tilt detection burst signal via the position detection sensor, the position detection apparatus detects the tilt angle of the electronic pen 1 in the manner to be described below.

Circuit Configuration Examples of the Position Detection Apparatus

Figure 7:
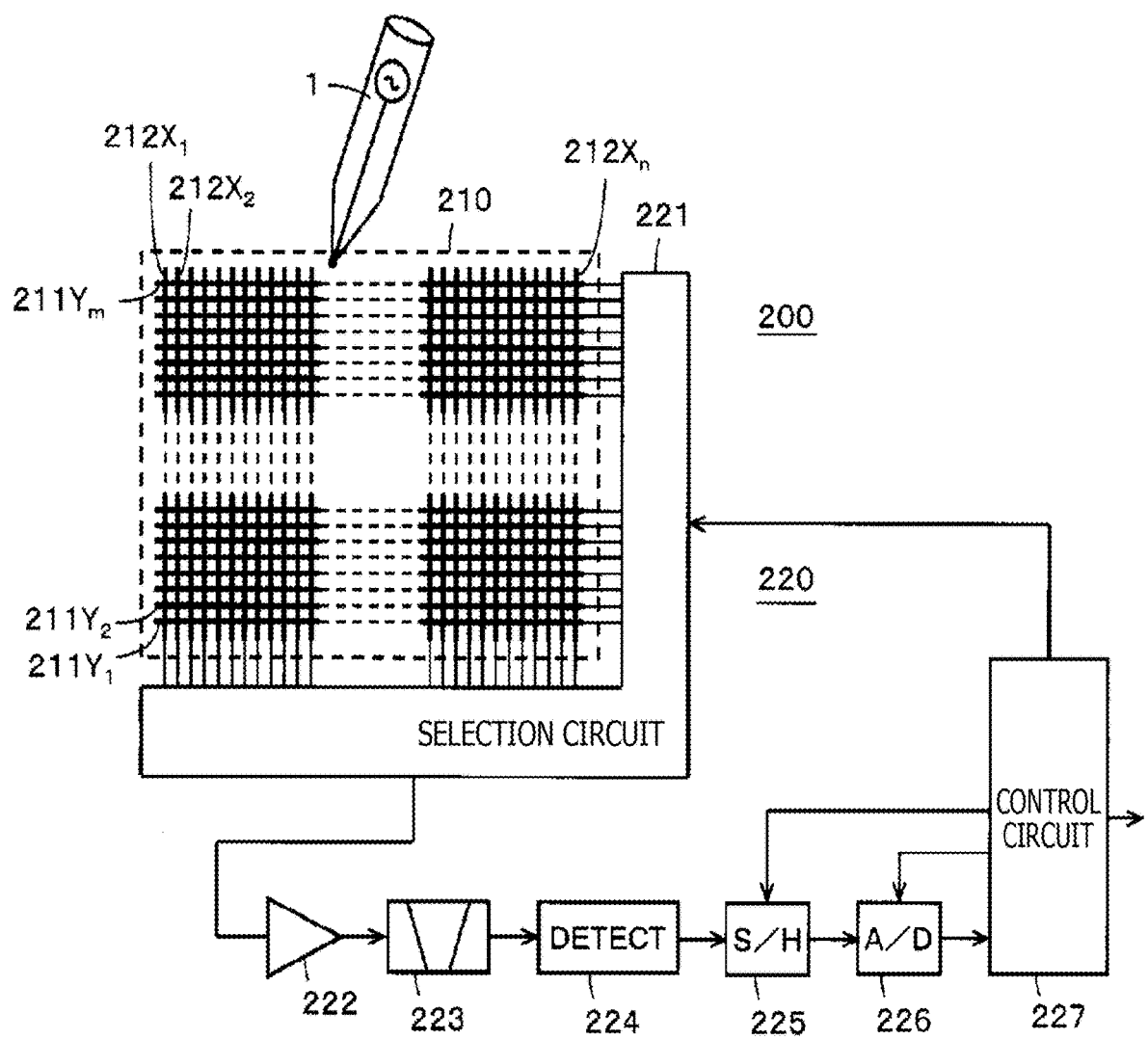
FIG. 7 is a diagram for explaining a configuration example of a position detection apparatus operated by the capacitance method and used in conjunction with the electronic pen in the first embodiment of the present invention.

Explained next are circuit configuration examples of the position detection apparatus and position detection sensor. FIG. 7 is a block diagram for explaining a configuration example of a reception processing circuit in a position detection apparatus 200 operated by the capacitance method, wherein the reception processing circuit processes the signal received from the electronic pen 1.

The position detection apparatus 200 of this example is constituted by a position detection sensor 210 and by a pen detection circuit 220 connected therewith as depicted in FIG. 7. In this example, the position detection sensor 210 is configured with a first conductor group and a second conductor group. The first conductor group includes multiple first conductors $211Y_1, 211Y_2, \ldots, 211Y_m$ (m is an integer of at least 1) each of which is extended horizontally (X-axis direction) and which are spaced a predetermined distance apart in an array in parallel with each other in the Y-axis direction. The second conductor group includes multiple second conductors $212X_1, 212X_2, \ldots, 212_n$ (n is an integer of at least 1) each of which is extended vertically (Y-axis direction) and which are spaced a predetermine distance apart in an array in parallel with each other in the X-axis direction.

It is to be noted that, in the description that follows, when there is no need to distinguish each of the multiple first conductors forming the first conductor group or each of the multiple second conductors forming the second conductor group, they will be referred to as the first conductors 211Y or the second conductors 212X.

A pen detection circuit 220 includes a selection circuit 221 acting as an input/output interface with the position detection sensor 210, an amplification circuit 222, a band-pass filter 223, a detection circuit 224, a sample hold circuit 225, an AD (Analog to Digital) conversion circuit 226, and a control circuit 227.

The selection circuit 221 selects a single conductor 211Y or 212X from the first conductor group or from the second conductor group on the basis of a control signal from the control circuit 227. The conductor selected by the selection circuit 221 is connected to the amplification circuit 222. The signal sent from the electronic pen 1 (i.e., from its electronic pen main body 3) and detected by the selector conductor is amplified by the amplification circuit 222. The output of the amplification circuit 222 is supplied to the band-pass filter 223, and only the frequency component corresponding to the signal transmitted from the electronic pen 1 is extracted.

An output signal from the band-pass filter 223 is detected by the detection circuit 224. An output signal from the detection circuit 224 is fed to the sample hold circuit 225 that sample-holds the signal by the sampling signal from the control circuit 227 before conversion to a digital value by the AD conversion circuit 226. Digital data from the AD conversion circuit 226 is read and processed by the control circuit 227.

The control circuit 227 outputs control signals to the sample hold circuit 225, the AD conversion circuit 226, and the selection circuit 221. Also, given the digital data from the AD conversion circuit 226, the control circuit 227 calculates the coordinates of that position on the position detection sensor 210 which is pointed to by the electronic pen 1, and detects writing pressure information.

The control circuit 227 further detects the tilt angle of the electronic pen 1 in the manner to be described below. A method of detecting the tilt angle of the electronic pen 1 with the position detection apparatus 200 is explained hereunder with reference to FIG. 8.

Figure 8A:
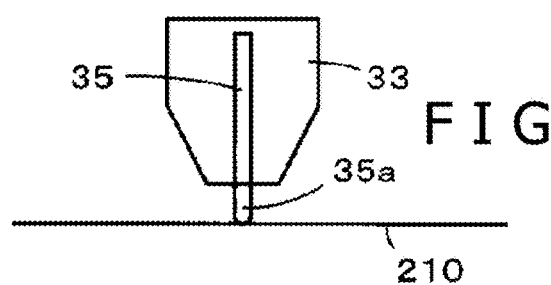
FIGS. 8A-8F are diagrams for explaining a method of detecting a tilt angle of the electronic pen with respect to the position detection apparatus in the example of FIG. 7.
Figure 8B:
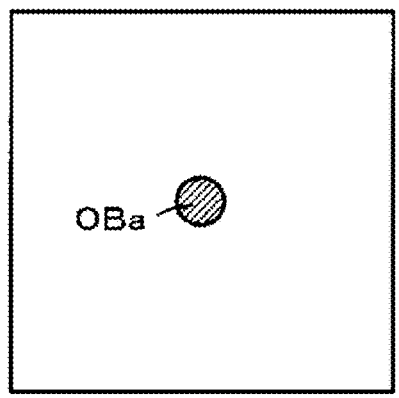
Figure 8C:
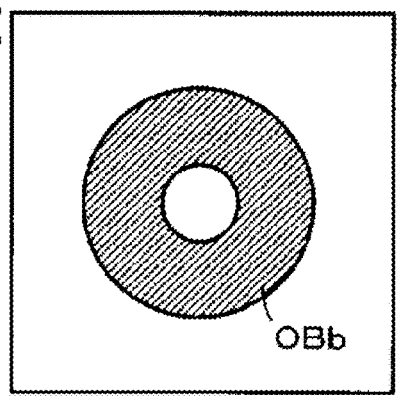

When the stylus 35 of the electronic pen main body 3 of the electronic pen 1 is perpendicular to an input surface of the position detection sensor 210 as depicted in FIG. 8A, capacitive coupling occurs between the pen tip part 35a of the stylus 35 and the position detection sensor 210 in a position detection period Ta. An area OBa where the capacitive coupling takes place has the shape of a perfect circle as depicted in FIG. 8B. On the other hand, in a tilt detection period Tb, capacitive coupling occurs between the peripheral electrode 33 and the position detection sensor 210. An area OBb where the capacitive coupling takes place has the shape of a ring as illustrated in FIG. 8C.

Figure 8D:
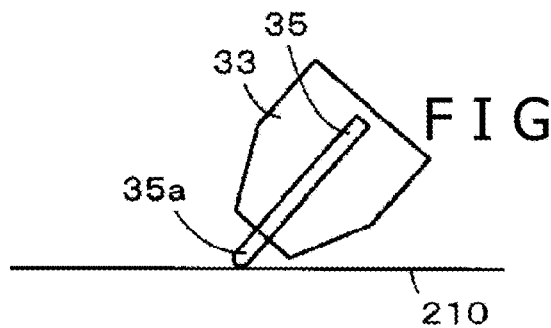
Figure 8E:
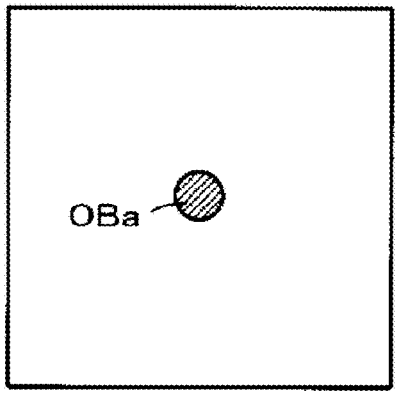

When the stylus 35 of the electronic pen main body 3 of the electronic pen 1 is tilted relative to the input surface of the position detection sensor 210 as depicted in FIG. 8D, the area OBa where capacitive coupling occurs between the pen tip part 35a of the stylus 35 and the position detection sensor 210 in the position detection period Ta is also shaped approximately as a perfect circle as illustrated in FIG. 8E.

Figure 8F:
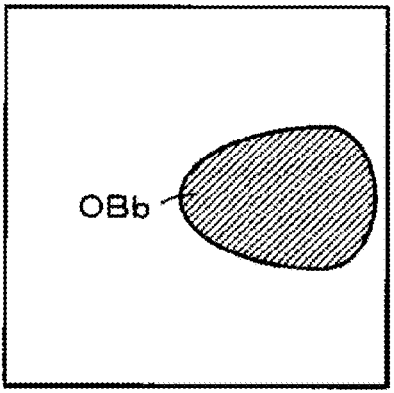

On the other hand, the area OBb where capacitive coupling takes place between the peripheral electrode 33 and the position detection sensor 210 in the tilt detection period Tb has the shape of an ellipse that reflects the tilt angle and that is elongated in the tilt direction as depicted in FIG. 8F.

As a result, the control circuit 227 of the position detection apparatus 200 is able to detect the magnitude of the tilt angle of the electronic pen 1 based on the length of the elliptic shape in a major axis direction of the area OBb depicted in FIG. 8F. Also, the control circuit 227 can detect the tilt direction of the electronic pen 1 by detecting the major axis direction of the elliptical shape of the area OBb that originates from the position pointed to by the electronic pen 1 and depicted in FIG. 8E.

It is to be noted that, in the above example, the peripheral electrode 33 used for detecting the tilt angle utilizes a signal having the same frequency as that of the signal supplied to the stylus 35. Alternatively, the frequency of the signal supplied to the stylus 35 may be different from the frequency of the signal fed to the peripheral electrode 33. In such a case, the position detection apparatus 200 can distinguish between the signal from the stylus 35 and the signal from the peripheral electrode 33. This makes it unnecessary to execute the position detection period Ta and the tilt detection period Tb on a time-division basis in the electronic pen main body 3 of the electronic pen 1 as described above. Instead, the signal from the stylus 35 and the signal from the peripheral electrode 33 may be transmitted simultaneously to the position detection sensor 210.

Effects of the First Embodiment

When the electronic pen 1 of the first embodiment is in use, with the pen tip side of the electronic pen main body 3 projected from the opening 2b of the pen housing 2 of the electronic pen 1, not only the pen tip part 35a of the stylus 35 but also a portion of the tapered part 33b of the peripheral electrode 33 on the pen tip side is projected from the opening 2b of the pen housing 2.

As a result, with the electronic pen 1 of the first embodiment, a distance not only from the pen tip part 35a of the stylus 35 but also from the tapered part 33b of the peripheral electrode 33 on the pen tip side to the input surface of the position detection sensor 210 is shortened, with the capacitive coupling (capacitive coupling) strengthened therebetween. Also, because the pen tip side of the peripheral electrode 33 is the tapered part 33b in this embodiment, the cross-sectional area of the pen tip side is made smaller. This permits more strengthened capacitive coupling with the position detection sensor 210.

Consequently, the electronic pen 1 of the first embodiment having a thinner shape profile can still establish strong capacitive coupling with the position detection sensor 210. This enables the position detection apparatus 200 to detect with high sensitivity the position pointed to by the electronic pen 1 on the position detection apparatus 200. Furthermore, with the electronic pen main body 3 of the electronic pen 1 in the first embodiment, the signal received from the position detection apparatus 200 by the peripheral electrode 33 defines the timing at which the electronic pen main body 3 starts transmitting signals. In this manner, the position detection apparatus can predict when signals are transmitted from the electronic pen main body 3 of the electronic pen 1 and wait for such signals. This enable good performance despite the fact that capacitive coupling is lower in coupling strength than electromagnetic induction coupling.

In the above-described first embodiment, the electronic pen main body 3 is configured to be replaceable with a commercially available ballpoint refill. Thus, by replacing the electronic pen main body 3 with a commercially available ballpoint pen in the pen housing 2 of the electronic pen 1, the electronic pen 1 can be used as a writing implement.

Second Embodiment

The electronic pen of a second embodiment is a variation of the first embodiment. In the above-described first embodiment, a single electronic pen main body 3 is housed inside the pen housing 2 of the electronic pen 1. In the second embodiment, by contrast, multiple electronic pen main bodies are housed inside the pen housing of the electronic pen. A knock mechanism is actuated to select one of the multiple electronic pen main bodies. The pen tip of the selected electronic pen main body is projected from the opening of the housing on the pen tip side.

As described above, the electronic pen main body 3 of the electronic pen 1 in the first embodiment is configured to be replaceable with the ballpoint refill 6. There is a multicolor ballpoint pen as a commercially available ballpoint pen furnished with multiple refills of different ink colors. The second embodiment provides an electronic pen having the electronic pen main body 3 housed in a pen housing similar to that of the multicolor ballpoint pen.

Figure 9:
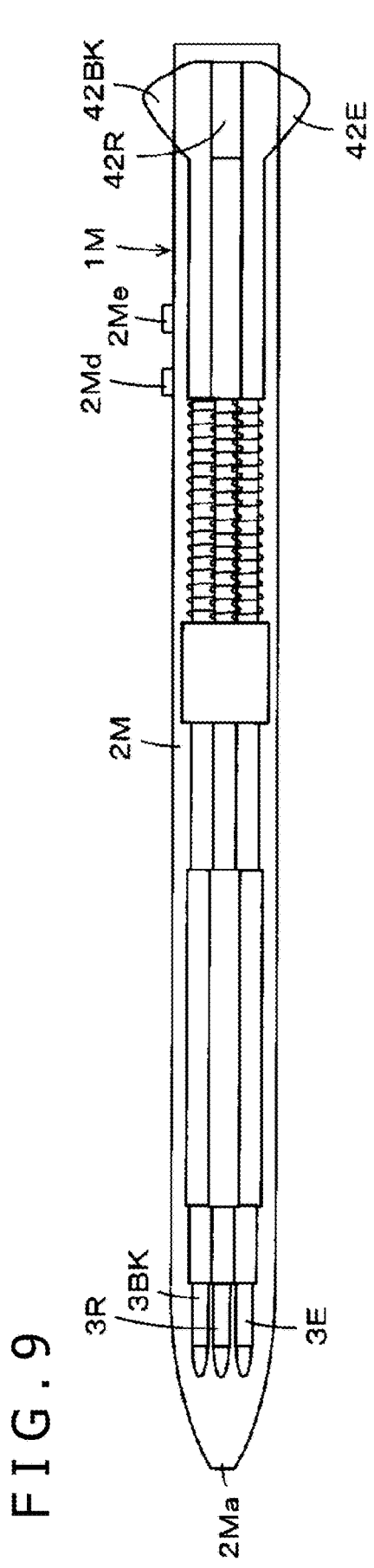
FIG. 9 is a diagram for explaining a configuration example of an electronic pen in a second embodiment of the present invention.

FIG. 9 is a configuration diagram depicting an appearance of an electronic pen 1M in the second embodiment. The example in FIG. 9 is also the electronic pen 1M configured with a pen housing 2M of a transparent synthetic resin that allows the inside to be seen through.

The pen housing 2M of the electronic pen 1M has a configuration substantially similar to that of the housing of a commercially available knock type multicolor ballpoint pen and that of the knock mechanism. What is different from the housing of the commercially available knock type multicolor ballpoint pen and the knock mechanism, as in the case of the pen housing 2 of the electronic pen 1 of the first embodiment and the knock cam mechanical part 4, is how charging electrodes 2Md and 2Me are disposed in the pen housing 2M and how the fitting part of the knock mechanism is fitted to the electronic pen main body 3. It is to be noted that, in the example of FIG. 9, three electronic pen main bodies 3BK, 3R, and 3E are housed in the pen housing 2M.

The electronic pen main bodies 3BK, 3R, and 3E are each configured to be externally similar to the electronic pen main body 3 of the first embodiment, except that they are dimensionally the same as multicolor ballpoint refills. It is to be noted that the electronic pen main bodies 3BK, 3R, and 3E of the second embodiment are in the main body housing 30 which, in addition to the above-described signal transmission circuit, incorporates electronic circuit components including an IC and its peripheral circuits for implementing a function of transmitting the pen main body's identification information to the position detection apparatus. The remaining configurations of the electronic pen main bodies 3BK, 3R, and 3E are similar to those of the electronic pen main body 3 of the first embodiment.

The knock mechanism of the electronic pen 1M is furnished with knocking rods 42BK, 42R and 42E fitted, respectively, to the electronic pen main bodies 3BK, 3R, and 3E. The fitting parts of the knocking rods 42BK, 42R, and 42E are configured similarly to the fitting part 43a of the knock cam mechanical part 4 in the first embodiment.

When one of the knocking rods 42BK, 42R, and 42E is slid toward the pen tip side, the pen tip part 35a of one of the electronic pen main bodies 3BK, 3R, and 3E is projected, along with a portion of the peripheral electrode 33. This permits capacitive coupling with the position detection sensor of the position detection apparatus.

In this embodiment, the position detection apparatus for use in conjunction with the electronic pen main bodies 3BK, 3R, and 3E has a function of receiving and identifying the identification information sent from each of the electronic pen main bodies 3BK, 3R, and 3E. That is, the position detection apparatus in this embodiment distinguishes between the electronic pen main bodies 3BK, 3R, and 3E and allows each of them to implement a function assigned thereto.

In this example, the electronic pen main body 3BK of this embodiment is assigned the function of displaying in black the writing path (i.e., characters or drawings) in a manner reflecting the pointed positions. The electronic pen main body 3R is assigned the function of displaying in red the writing path in a manner reflecting the pointed positions. The electronic pen main body 3E is assigned the function of erasing the writing path input so far through pointing, according to the pointed positions.

The position detection apparatus recognizes the identification information included in the signal transmitted from each of the electronic pen main bodies 3BK, 3R, and 3E. The position detection apparatus then supplements the coordinate information regarding the position pointed to by the detected electronic pen main body 3BK, 3R, or 3E with information regarding the color of the writing path or the erasure thereof in accordance with the identification information, before feeding the supplemented information to a personal computer having a display screen, for example. It is to be noted that the functions assigned to the electronic pen main bodies are not limited to those of representing the colors in which to display the writing path reflecting the pointed position as in this example; the assigned functions may also involve designating the thickness of the writing path or the types of the displayed lines such as a solid line, a dotted line, and a dashed line.

It is to be noted that, in the case of the electronic pen 1M in the second embodiment, multiple electronic pen main bodies 3 are housed inside the pen housing 2M. That means the axial direction of each of the electronic pen main bodies 3 is not aligned with an opening 2Ma of the pen housing 2M. For this reason, when the knock mechanism is actuated to project the pen tip part of one of the multiple electronic pen main bodies 3 from the opening 2Ma of the pen housing 2M, the projected electronic pen main body 3 is slightly bent relative to the fitting part of the pen housing 2M.

However, since the main body cylindrical part 31 of the electronic pen main body 3 in this embodiment is furnished with the resin pipe part 31b, the elasticity of the resin pipe part 31b permits the bending of the electronic pen main body 3 when the tip part of the electronic pen main body 3 is projected. In a case where the mechanism of the multicolor ballpoint pen housing such as that of the second embodiment is to be addressed, the length of the resin pipe part 31b in the axial direction may be adjusted in such a manner as to let the resin pipe part 31b suitably absorb the bending of the electronic pen main body 3 when its tip part is projected.

It is to be noted that the second embodiment is configured such that the three knocking rods 42BK, 42R, and 42E all have the conductor-equipped fitting parts that are fitted to the electronic pen main bodies 3. Alternatively, at least one of the multiple knocking rods may be configured to have the conductor-free fitting part to be fitted to the electronic pen main body 3; the other knocking rods may be configured with conductor-free fitting parts for use with ballpoint refills.

While the second embodiment is described as an example involving three knocking rods, there may be two, or four, or more than four knocking rods instead.

Third Embodiment

The electronic pen main body 3B of a third embodiment is configured differently from the electronic pen main body 3 of the above-described first and second embodiments in terms of how the main body is fitted to the pen housing of the electronic pen. The other aspects of the configuration of the third embodiment are similar to those of the first and second embodiments. Thus, the fitting part disposed in the pen housing 2B of an electronic pen 1B and fitted to the electronic pen main body 3B of the third embodiment is configured differently from the above-described first and second embodiments.

Figure 10A:
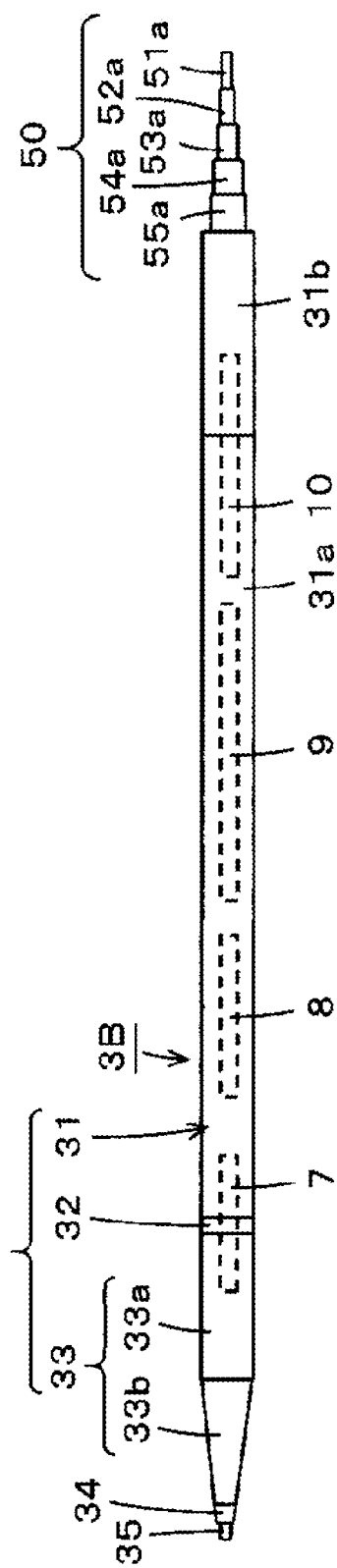
FIGS. 10A-10C are diagrams for explaining a configuration example of an electronic pen main body for use with an electronic pen in a third embodiment of the present invention.
Figure 10B:
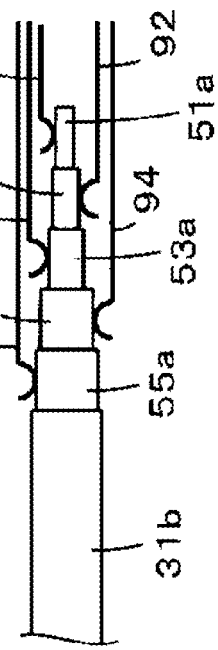
Figure 10C:
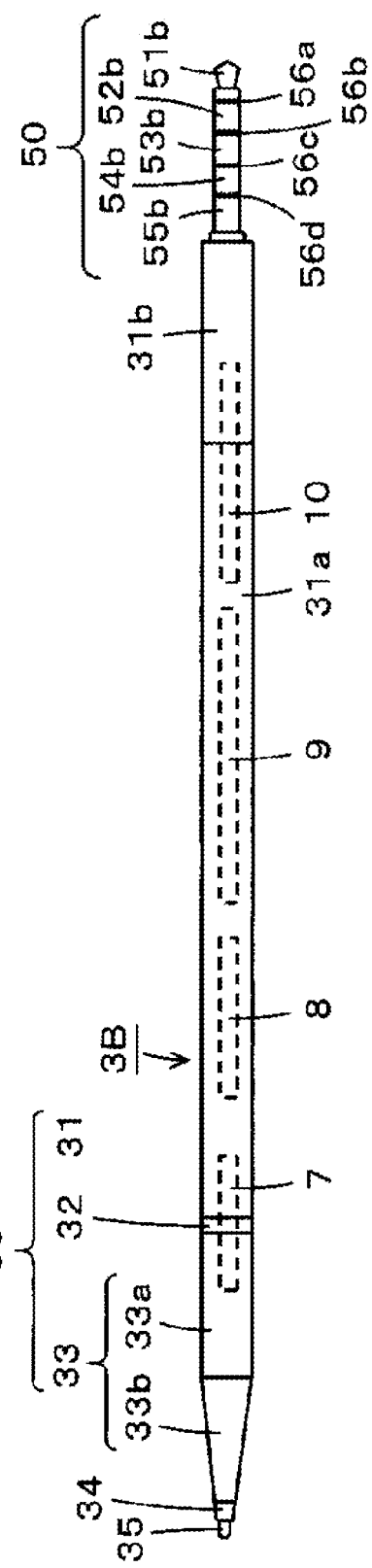

FIG. 10 is a set of diagrams depicting a configuration example of the electronic pen main body 3B of the third embodiment. FIGS. 10A and 10C depict a first example and a second example of the electronic pen main body 3B of this embodiment, respectively. The first and second examples here are configured differently from each other only in terms of how the main body is fitted to the fitting part of the pen housing 2B of the electronic pen 1B in the third embodiment. The other aspects of the configuration of the first and second examples are substantially similar therebetween. In the description that follows, the parts similar to those of the electronic pen main body 3 in the above-described first and second embodiments are designated by like reference signs, and these parts will not be discussed further in detail.

Also, FIG. 11A depicts a configuration example of the electronic pen 1B of the third embodiment to which the electronic pen main body 3B of this embodiment is fitted. FIG. 11A illustrates a state in which the pen tip side of the electronic pen main body 3B of the electronic pen 1B in the third embodiment is projected from the opening of the pen housing 2B. This configuration corresponds to what is depicted in FIG. 1B regarding the electronic pen 1 of the above-described first embodiment.

The pen housing 2B of the electronic pen 1B in the third embodiment is equipped with a fitting part 43ap to which the electronic pen main body 3B of this embodiment is fitted, as depicted in FIG. 11. A side switch 2S is disposed on the side surface of the pen housing 2B. Also, a conductor band 2f is disposed on that position of the pen housing 2B which is gripped by the user upon use. These aspects of the configuration are different from those of the electronic pen 1 of the first embodiment; the remaining aspects are similar. The side switch 2S has the configuration of a pushbutton switch or a slide switch, wherein the configuration is well known for electronic pens and thus not discussed further hereunder in detailed examples.

The electronic pen 1B of the third embodiment transmits operation information regarding the side switch 2S to the electronic pen main body 3B via the fitting part 43ap. In addition to the position detection signal and the writing pressure information, the electronic pen main body 3B of the third embodiment transmits the operation information regarding the side switch 2S to the position detection apparatus. The position detection apparatus has a function of processing the operation information regarding the side switch 2S. In response to the operation information regarding the side switch 2S received from the electronic pen main body 3B, the position detection apparatus performs processing corresponding to the relevant function provided therein.

Also, the conductor band 2f is constituted by a cylindrical body made of, for example, an electrically conducting material such as a conductive rubber that partially covers the outer circumference of the pen housing 2 in the axial direction. In the third embodiment, the conductor band 2f is configured to be connected to the ground electrode of the electronic pen main body 3B via the fitting part 43ap. When the user grips the conductor band 2f upon use, the conductor band 2f and the ground electrode of the electronic pen main body 3B connected therewith (also connected with the metal pipe part 31a of the main body cylindrical part 31) are connected to ground (i.e., grounded) through the user's body.

Also in the electronic pen main body 3B of the embodiment, as depicted in FIGS. 10A and 10C, on the pen tip side of the main body cylindrical part 31, the pen tip side of the main body housing 30 of the electronic pen main body 3B coupled with the peripheral electrode 33 via the cylindrical coupling member 32 is capped with the front cap 34. Through the opening of the front cap 34, the stylus 35 is inserted and fitted. As with the electronic pen main body 3 of the above-described first and second embodiments, the hollow space in the main body housing 30 houses the stylus holding member 7, the writing pressure detection part 8, the printed-circuit board 9 including the signal transmission circuit, and the capacitor 10 as an example of the electrical storage element for supplying the supply power voltage, which are arrayed in the axial direction.

Also, in the electronic pen main body 3B of the third embodiment, the main body cylindrical part 31 is constituted by the metal pipe part 31a and the resin pipe part 31b coupled with each other. The rear end of the resin pipe part 31b is furnished with a connector, which is a connector plug 50 in this example and fitted to the fitting part 43ap disposed in the pen housing 2B of the electronic pen 1B.

The connector plug 50 is electrically connected to the capacitor 10 and to the electronic circuits formed on the printed-circuit board 9 inside the electronic pen main body 3B. The connector plug 50 has multiple terminal parts, which are five terminal parts 51a, 52a, 53a, 54a, and 55a in this example and insulated from each other.

In the electronic pen main body 3B of the first example in FIG. 10A, the five terminal parts 51a, 52a, 53a, 54a, and 55a of the connector plug 50 are configured as explained hereunder. That is, in this example, the terminal part 51a is constituted by a conductive metal forming a shaft at the center. In the example in FIG. 10A, the connector plug 50 is formed by the cylindrical terminal parts 52a, 53a, 54a, and 55a combined concentrically with respect to a rod-like conductive metal of the terminal part 51a, wherein each of the cylindrical terminal parts has an insulating layer formed on its inner wall surface.

In this case, the terminal part 51a of the conductive metal constituting the center shaft forms a tip part in the axial direction. The terminal part 51a has its circular periphery and its tip exposed by a predetermined length in the axial direction. Also, the cylindrical terminal parts 52a, 53a, 54a, and 55a each have its circular periphery exposed by a predetermined length in the axial direction. That means the five terminal parts 51a, 52a, 53a, 54a, and 55a of the connector plug 50 each have its circular conductive contact part exposed at a different position in the axial direction. It is to be noted that the terminal part 51a, shaped cylindrically, has its circular peripheral side surface and its tip portion forming a conductive contact part.

The connector plug 50 is inserted into a fitting recessed part of a connector jack 90 formed in the fitting part 43ap disposed on the rotator 43 in the hollow space of the pen housing 2B of the electronic pen 1B. This creates a state in which the connector plug 50 is elastically connected to each of five contact terminals 91, 92, 93, 94, and 95 disposed on the connector jack 90, as depicted in FIG. 10B. The five contact terminals 91, 92, 93, 94, and 95, each made of a conductive elastic metal, are connected electrically to the charging electrodes 2d and 2e, the side switch 2S, and the conductor band 2f disposed on the pen housing 2B (see FIG. 11B).

When the connector plug 50 is thus inserted to and coupled with the connector jack 90, the electronic circuit components inside the electronic pen main body 3B are electrically connected to those in the pen housing 2B of the electronic pen 1B. FIG. 11B schematically depicts some typical electronic circuit components disposed in the pen housing 2B of the electronic pen 1B and connected electrically to electrical circuit components inside the electronic pen main body 3B when the connector plug 50 is inserted to and coupled with the connector jack 90.

In the example of FIG. 11B, the terminal parts 51a, 52a, 53a, 54a, and 55a of the connector plug 50 are each connected electrically to the charging electrodes 2e and 2d, to both ends 2Sa and 2Sb of the side switch 2S, and to the conductor band 2f via the five contact terminals 91, 92, 93, 94, and 95 (not depicted in FIG. 11B) disposed on the connector jack 90.

In this case, the circular conductive contact parts of the terminal parts 51a, 52a, 53a, 54a, and 55a of the connector plug 50 are connected respectively to the contact terminals 91, 92, 93, 94, and 95 of the connector jack 90. As a result, even when the electronic pen main body 3B is rotated around its center line in the axial direction, the electrical connection is continuously maintained and electrical disconnection can be averted.

In the second example of the electronic pen main body 3B in FIG. 10C, five terminal parts 51b, 52b, 53b, 54b, and 55b of the connector plug 50 are configured as described hereunder. The connector plug 50 of this example has a configuration similar to that of pin plugs for audio purposes (e.g., 5-pin plugs with a noise cancelling function). In this example, the five terminal parts 51b, 52b, 53b, 54b, and 55b have their circular conductive contact parts of the same diameter exposed at different positions in the axial direction.

That is, the terminal part 51b, which is the most projected tip end of the five terminal parts 51b, 52b, 53b, 54b, and 55b, serves as a tip terminal. The intermediate three terminal parts 52b, 53b, and 54b serve as ring terminals insulated from one another by means of insulating rings 56a, 56b, 56c, and 56d. The terminal part 55b at the base side of the electronic pen main body 3B serves as a sleeve terminal.

As in the case of FIG. 10B, the connector jack 90 coupled with the connector plug 50 of the electronic pen main body 3B in FIG. 10C has five contact terminals that come into contact with the circular conductive contact parts of the five terminal parts 51b, 52b, 53b, 54b, and 55b to establish electrical connection. Consequently, the coupling of the connector jack 90 with the connector plug 50 of the electronic pen main body 3B of the second example in FIG. 10C is similar to that in the first example.

It is to be noted that, in the above examples, the connector plug is disposed at the rear end of the main body cylindrical part 31 of the electronic pen main body 3B opposite to the pen tip side, with the connector jack arranged at the fitting part 43ap of the pen housing 2B. Alternatively, the connector jack may be disposed at the rear end of the main body cylindrical part 31 of the electronic pen main body 3B opposite to the pen tip side, with the connector plug arranged at the fitting part 43ap of the pen housing 2B.

It is to be noted that, obviously, the connector structure in the third embodiment can also be applied to the multicolor ballpoint pen in the second embodiment. In such a case, respective side switches may be arranged to correspond to multiple electronic pen main bodies to be fitted to the multiple fitting parts of the pen housing. Alternatively, a single side switch may be provided for shared use by the multiple electronic pen main bodies. Obviously, in a case where one of the multiple fitting parts of the pen housing is appropriated for use with the electronic pen main body, with the remaining fitting parts used in conjunction with ballpoint refills, it is sufficient to provide one side switch for use with the single electronic pen main body.

Other Embodiments

Figure 12A:
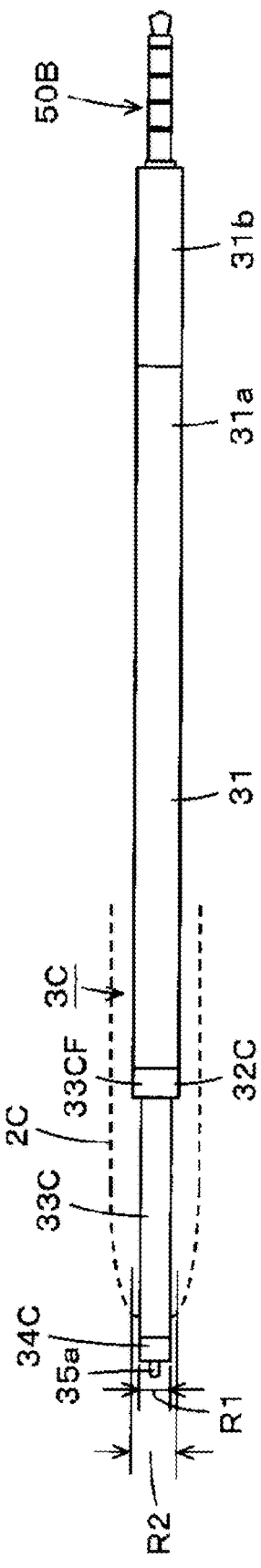
FIGS. 12A-12C are diagrams for explaining configuration examples of electronic pen main bodies in other embodiments of the present invention.

FIG. 12 depicts other embodiments of the electronic pen main body. FIG. 12A depicts a variation of the electronic pen main body 3 of the above-described first embodiment. As with the first embodiment, this variation is configured to be replaceable with the ballpoint refill 6. In the electronic pen main body 3C of this embodiment, the parts similar to those of the first embodiment are designated by like reference signs, and these parts will not be discussed further in detail.

The electronic pen main body 3C of this embodiment uses a peripheral electrode 33C shaped differently from the peripheral electrode 33 of the electronic pen main body 3 of the first embodiment. That is, as depicted in FIG. 12A, the peripheral electrode 33C of the electronic pen main body 3C of this embodiment is given a cylindrical shape with its outer diameter kept constant in the axial direction, wherein the outer diameter is the above-mentioned diameter R1 (see FIG. 2) smaller than the diameter of the opening 2b of the electronic pen housing 2.

Because the peripheral electrode 33C of the electronic pen main body 3C of this embodiment is configured differently from that of the electronic pen main body 3 of the first embodiment, a cylindrical coupling member 32C for coupling the peripheral electrode 33C with the main body cylindrical part 31 is configured to couple the peripheral electrode 33C, in a manner according to the structure of the peripheral electrode 33C, with the main body cylindrical part 31 via a ring-shaped flange part 32CF. Also, a front cap 34C is configured differently to correspond to the configuration of the peripheral electrode 33C. The other configurations are similar to those of the electronic pen main body 3 of the first embodiment.

The electronic pen main body 3C of the example in FIG. 12A can also be housed inside the pen housing 2 of the electronic pen 1, with the resin pipe part 31b of the main body cylindrical part 31 fitted to the fitting part 43a. Pressing the knocking rod 42 of the knock cam mechanical part 4 causes the pen tip part 35a of the stylus 35 on the pen tip side of the electronic pen main body 3C, the front cap 34C, and a portion of the peripheral electrode 33C on the pen tip side to project from the opening 2b.

As a result, the electronic pen main body 3C of the example in FIG. 12A can also provide advantageous effects similar to those of the electronic pen main body 3 of the first embodiment. Upon use, the stylus 35, the front cap 34C, and a portion of the peripheral electrode 33C on the pen tip side are projected to the outside from the opening of the electronic pen housing 2C as indicated by a dotted line in FIG. 10A. In this case, the cylindrical part with a constant outer diameter of the peripheral electrode 33C is positioned at the opening of the housing 2C. This makes it easy to adjust the outer diameter of the cylindrical part of the peripheral electrode 33C such that the pen tip side of the electronic pen main body 3C will not rattle in the opening of the housing 2C.

Figure 12B:
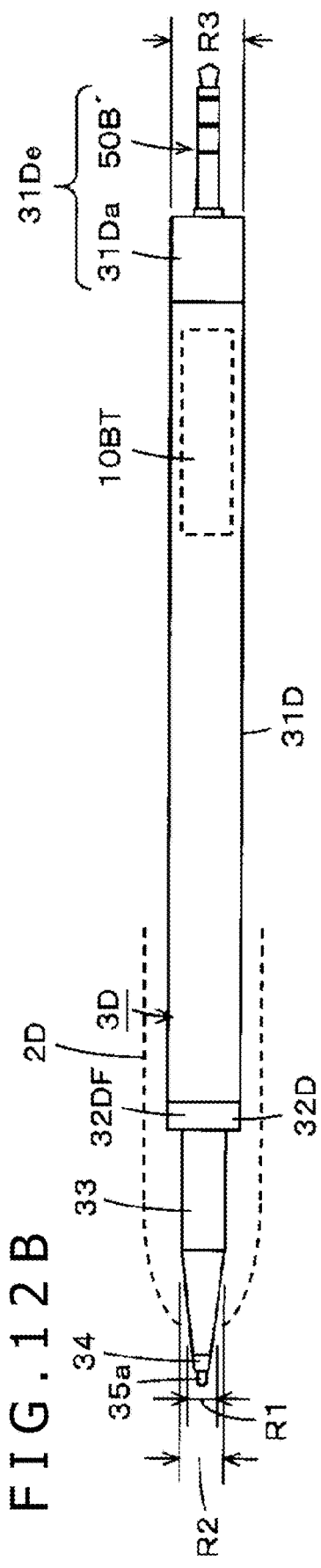

Next, the example depicted in FIG. 12B is also another variation of the electronic pen main body 3 of the above-described first embodiment. The main body cylindrical part 31D and a cylindrical coupling member 32D of the electronic pen main body 3D in this embodiment are configured to be different from those of the electronic pen main body 3 of the first embodiment; the remaining configurations are similar. Thus, those parts of the electronic pen main body 3D in this embodiment that are also similar to those in the first embodiment are designated by like reference signs in the ensuing description, and these parts will not be discussed further in detail.

The main body cylindrical part 31D of the electronic pen main body 3D in this embodiment has an outer diameter R3 larger than the outer diameter R2 of the main body cylindrical part 31 of the electronic pen main body 3 in the first embodiment. The main body cylindrical part 31D of the electronic pen main body 3D in this embodiment has an inner diameter also larger than that of the main body cylindrical part 31 of the electronic pen main body 3 in the first embodiment.

Because the electronic pen main body 3D in this embodiment has the main body cylindrical part 31D configured differently from that of the electronic pen main body 3 in the first embodiment, the cylindrical coupling member 32D for coupling the peripheral electrode 33 with the main body cylindrical part 31D is configured to couple the peripheral electrode 33 with the main body cylindrical part 31D via a ring-shaped flange part 32DF in a manner according to the configuration of the main body cylindrical part 31D.

As described above, a large hollow space is provided in the main body cylindrical part 31D of the electronic pen main body 3D of this embodiment. Given the large hollow space in the main body cylindrical part 31D, the electronic pen main body 3D of this embodiment is configured to hold a primary cell (battery) 10BT in its hollow space in place of the capacitor 10 used as the electrical storage element by the electronic pen main body 3 in the first embodiment, as depicted in FIG. 12B. The other electrical circuit components of the main body cylindrical part 31D are housed therein in a manner similar to the first embodiment; these components are fed with necessary supply power voltages from the primary battery 10BT.

As a result, the electronic pen main body 3D of this embodiment has no need for a configuration enabling the capacitor 10 to be charged from the outside. In this example, the main body cylindrical part 31D is made of a metal pipe, of which the rear end, opposite to the pen tip side, is fitted detachably with a closing cap 31De. The electronic pen main body 3D of this embodiment is configured to let the primary battery 10BT housed in the main body cylindrical part 31D be replaced, out of the main body cylindrical part 31D by removing the closing cap 31De. As with the above-described embodiments, the main body cylindrical part 31D may alternatively be configured using the metal pipe part coupled with the resin pipe part.

The electronic pen housing that holds the electronic pen main body 3D in this embodiment is configured differently from the electronic pen housing of the above-described embodiments. That is, even in a case where a housing including the knock cam mechanism or the knock mechanism is used as the electronic pen housing for this electronic pen main body 3D as with the above-described embodiments, the fitting part of the electronic pen housing which is fitted to the electronic pen main body 3D has no need for electrical configurations. Still, it is to be noted that as with the above-described embodiments, the pen tip side of the housing has an opening with a diameter larger than the diameter R1 and that the pen tip part 35a of the stylus 35 on the pen tip side of the electronic pen main body 3D, the front cap 34, and a portion of the peripheral electrode 33 on the pen tip side are projected to the outside from the opening of the housing upon use.

In addition, there are a well-known variety of types of ballpoint refills in addition to the resin pipe with a thin ink storage part as depicted in FIG. 2A. There also is a cartridge type with a thick ink storage part such as the main body cylindrical part 31D of the electronic pen main body 3D of this example. The electronic pen main body 3D of this embodiment can also be attached to the housing of that cartridge type ballpoint pen.

It is to be noted that, also in a case where the main body cylindrical part 31D is configured to be thick as with the electronic pen main body 3D of this embodiment, the primary battery 10BT in the hollow space of the main body cylindrical part 31D may be replaced with an electrical storage element such as a secondary battery or a capacitor. Also in this case, the rear end of the main body cylindrical part 31D may be configured similarly to the electronic pen main body 3 of the first embodiment or to the electronic pen main body 3B of the third embodiment.

The electronic pen using the electronic pen main body 3C of the example in FIG. 12B can also provide advantageous effects similar to those of the electronic pen 1 of the first embodiment. Upon use, the stylus 35, the front cap 34, and a portion of the tapered part of the peripheral electrode 33 on the pen tip side are projected to the outside from the opening of the electronic pen housing 2D as indicated by a dotted line in FIG. 12B.

Figure 12C:
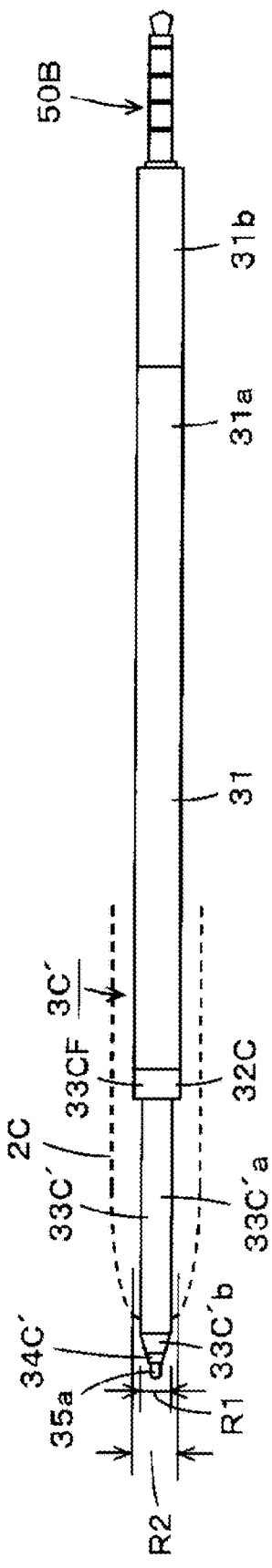

FIG. 12C depicts a variation of the electronic pen main body 3C in FIG. 12A. The peripheral electrode 33C' of the electronic pen main body 3C' of the example in FIG. 12C differs from the peripheral electrode 33C of the electronic pen main body 3 of the example in FIG. 12A in that the pen tip side has a tapered part 33C'b. That is, the peripheral electrode 33C' of the electronic pen main body 3C' of this example is shaped such that a tapered part 33C'b is formed on the pen tip side of a cylindrical part 33C'a having the diameter R1 smaller than the diameter R0 of the opening 2b of the electronic pen housing 2 (see FIG. 1). In this example, a front cap 34C' is formed at the tip of the tapered part 33C'b of the peripheral electrode 33C'. The other configurations are the same as those of the electronic pen main body 3C of the example in FIG. 12A.

Also in the case of the electronic pen main body 3C' of the example in FIG. 12C, the stylus 35, the front cap 34C', and a portion of the peripheral electrode 33C' on the pen tip side are projected to the outside from the opening of the housing 2C of the electronic pen. In this case, the portion of the peripheral electrode 33C' projected externally includes not only the tapered part 33C'b but also a portion of the cylindrical part 33C'a, with the cylindrical part 33C'a positioned at the opening of the housing 2C. This provides advantageous effects similar to those of the example in FIG. 12A.

Other Embodiments and Variations

In the above description of the embodiments, the electronic pen main body is configured to be replaceable with a ballpoint refill as a writing instrument. Obviously, the electronic pen main body may be configured alternatively for dedicated use as the electronic pen.

Although the above-described embodiments are configured such that the electronic pen main body is inserted to and retracted from the housing by the knock mechanism, the electronic pen main body is not limited to the knock type. Alternatively, the electronic pen main body may simply be housed inside the pen housing. In this case, the pen tip side of the electronic pen main body is always projected from the opening of the pen housing. The projected pen tip side may then be protected by a screw-on or press-fit cap fitted to the pen housing to cover the pen tip side of the electronic pen main body.

It has been explained that the peripheral electrode is configured with a cylindrical conductor. Alternatively, the peripheral electrode may be configured with multiple conductors divided along the circumferential direction that collectively form a cylindrical shape.

It has also been explained that the stylus 35 is configured with a conductive metal. Alternatively, any suitable conductive material may be used to form the stylus 35. For example, the stylus 35 may be configured using a hard resin mixed with conductor powder.

It is to be noted that the main body cylindrical part of the electronic pen main body may be configured using not the metal pipe part and the resin pipe part coupled with each other but a single metal pipe or a single resin pipe. In a case where the main body cylindrical part is configured with one metal pipe and where the main body cylindrical part needs to be electrically connected with electronic components inside the housing, a member equipped with a conductor for electrical connection is provided to the rear end of the main body cylindrical part opposite to the pen tip side, with an insulator such as a resin interposed between the member and the cylindrical part.

DESCRIPTION OF REFERENCE SYMBOLS

1 Electronic pen
2 Electronic pen housing
3 Electronic pen main body
4 Knock cam mechanism
7 Stylus holding member
8 Writing pressure detection part
9 Printed-circuit board
10 Capacitor for electrical storage
10BT Primary battery
30 Housing of electronic pen main body
31 Main body cylindrical part
32 Cylindrical coupling member
33 Peripheral electrode
34 Front cap
35 Center electrode (stylus)

The invention claimed is:
1. An electronic pen having a cylindrical housing with an opening on one end thereof forming a pen tip side in an axial direction, the cylindrical housing holding at least one cartridge-type electronic pen main body inside, the cartridge-type electronic pen main body comprising:
a conductive center electrode of which one end in the axial direction forms a pen tip; and
a peripheral electrode disposed around the center electrode except at least for the pen tip, the peripheral electrode being insulated from the center electrode, wherein the peripheral electrode includes a pen tip side portion and an opposite side portion along the axial direction;

wherein, when the one end of the center electrode forming the pen tip is projected to the outside from the opening of the cylindrical housing upon use, the pen tip side portion of the peripheral electrode is also projected to the outside from the opening, such that both the one end of the center electrode and the pen tip side portion of the peripheral electrode are projected beyond a distal end of the cylindrical housing of the electronic pen to capacitively couple with a sensor surface while the opposite side portion of the peripheral electrode remains within the cylindrical housing of the electronic pen.

2. The electronic pen according to claim 1,
wherein a diameter of the center electrode of the cartridge-type electronic pen main body and a diameter of the pen tip side portion of the peripheral electrode projected from the opening are each equal to or smaller than a diameter of a pen tip part of a ballpoint refill, the cartridge-type electronic pen main body having substantially a same length as that of the ballpoint refill.

3. The electronic pen according to claim 2,
wherein the cylindrical housing includes a knock type ballpoint pen mechanism that corresponds to the cartridge-type electronic pen main body or to the ballpoint refill.

4. The electronic pen according to claim 1,
wherein the cylindrical housing is configured to hold a ballpoint refill inside and to function as a ballpoint pen.

5. The electronic pen according to claim 4,
wherein the cylindrical housing includes a knock type ballpoint pen mechanism that corresponds to the cartridge-type electronic pen main body or to the ballpoint refill.

6. The electronic pen according to claim 1,
wherein the cylindrical housing holds inside a plurality of the cartridge-type electronic pen main bodies and a knock type multicolor ballpoint pen mechanism allowing one of the cartridge-type electronic pen main bodies to be selected in such a manner that one end of the selected cartridge-type electronic pen main body is projected to the outside from the opening.

7. The electronic pen according to claim 6,
wherein the cylindrical housing holds inside one or a plurality of refills of the ballpoint pen mechanism in place of one or more of the plurality of the cartridge-type electronic pen main bodies, in such a manner that the electronic pen functions as a knock type multicolor ballpoint pen.

8. A cartridge-type electronic pen main body allowing at least a pen tip of an electronic pen to be housed in a cylindrical housing of the electronic pen in such a manner as to be projectable from one opening of the cylindrical housing in an axial direction, the cartridge-type electronic pen main body comprising:
a conductive center electrode of which one end in the axial direction forms the pen tip; and
a peripheral electrode disposed around the center electrode except at least for the pen tip, the peripheral electrode being insulated from the center electrode,
wherein the peripheral electrode includes a pen tip side portion and an opposite side portion along the axial direction,
wherein, when the one end of the center electrode forming the pen tip is projected to the outside from the opening of the cylindrical housing of the electronic pen upon use, the pen tip side portion of the peripheral electrode is also projected to the outside from the opening of the cylindrical housing of the electronic pen, such that both the one end of the center electrode and the pen tip side portion of the peripheral electrode are projected beyond a distal end of the cylindrical housing of the electronic pen to capacitively couple with a sensor surface while the opposite side portion of the peripheral electrode remains within the cylindrical housing of the electronic pen.

9. The cartridge-type electronic pen main body according to claim 8, further comprising:
a main body cylindrical part incorporating a signal transmission circuit generating a signal supplied at least to the center electrode,
wherein the opposite side portion of the peripheral electrode is coupled with a pen tip side of the main body cylindrical part in the axial direction, and
the main body cylindrical part is not projected to the outside from the opening of the cylindrical housing of the electronic pen.

10. The cartridge-type electronic pen main body according to claim 9,
wherein the peripheral electrode and the main body cylindrical part coupled with each other form a hollow space therein in which a fitting part for the center electrode is disposed, and
the center electrode is detachably fitted to the fitting part.

11. The cartridge-type electronic pen main body according to claim 9,
wherein the pen tip side portion of the peripheral electrode has a diameter smaller than that of the main body cylindrical part.

12. The cartridge-type electronic pen main body according to claim 9,
wherein the main body cylindrical part includes a battery that supplies a supply power voltage to the signal transmission circuit.

13. The cartridge-type electronic pen main body according to claim 9,
wherein the main body cylindrical part includes an electrical storage element and a terminal conductor, the electrical storage element supplying a supply power voltage to the signal transmission circuit, the terminal conductor allowing the electrical storage element to be charged from the outside.

14. The cartridge-type electronic pen main body according to claim 9,
wherein the peripheral electrode is configured to be grounded so as to function as a shield electrode when the signal is supplied from the signal transmission circuit to the center electrode.

15. The cartridge-type electronic pen main body according to claim 9,
wherein the peripheral electrode is configured to function as a tilt detection electrode when the signal is supplied from the signal transmission circuit to the peripheral electrode.

16. The cartridge-type electronic pen main body according to claim 9,
wherein the main body cylindrical part is configured to be bendable in a direction intersecting with the axial direction.

* * * * *